United States Patent
Yang et al.

(10) Patent No.: US 10,676,981 B2
(45) Date of Patent: Jun. 9, 2020

(54) VACUUM GLAZING AND METHOD FOR MANUFACTURING THE SAME

(71) Applicant: LG Electronics Inc., Seoul (KR)

(72) Inventors: Eunsoo Yang, Seoul (KR); Soyoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/206,569

(22) Filed: Nov. 30, 2018

(65) Prior Publication Data

US 2019/0162011 A1    May 30, 2019

(30) Foreign Application Priority Data

Nov. 30, 2017    (KR) .................. 10-2017-0163726

(51) Int. Cl.
| | | |
|---|---|---|
| *E06B 3/00* | (2006.01) | |
| *E06B 3/54* | (2006.01) | |
| *E06B 3/663* | (2006.01) | |
| *E06B 3/66* | (2006.01) | |
| *E06B 3/673* | (2006.01) | |
| *E06B 3/677* | (2006.01) | |
| *E06B 3/12* | (2006.01) | |

(52) U.S. Cl.
CPC .............. *E06B 3/5454* (2013.01); *E06B 3/12* (2013.01); *E06B 3/663* (2013.01); *E06B 3/6612* (2013.01); *E06B 3/66342* (2013.01); *E06B 3/673* (2013.01); *E06B 3/6775* (2013.01); *E06B 3/67326* (2013.01)

(58) Field of Classification Search
None
See application file for complete search history.

(56) References Cited

U.S. PATENT DOCUMENTS

| | | | | |
|---|---|---|---|---|
| 2,157,425 | A * | 5/1939 | Nelson | B61D 25/00 52/204.593 |
| 3,698,148 | A * | 10/1972 | Marantier | E06B 3/62 52/204.597 |
| 4,187,642 | A * | 2/1980 | Morinaga | B60J 10/74 49/406 |
| 4,615,159 | A * | 10/1986 | Kessler | E06B 3/56 52/171.3 |
| 5,131,194 | A * | 7/1992 | Anderson | E06B 3/62 52/144 |

(Continued)

FOREIGN PATENT DOCUMENTS

| | | |
|---|---|---|
| DE | 102007003962 | 5/2012 |
| KR | 2019930021964 | 10/1993 |

(Continued)

OTHER PUBLICATIONS

Extended European Search Report in European Application No. 18208525.8, dated Apr. 9, 2019, 8 pages.

*Primary Examiner* — Basil S Katcheves
(74) *Attorney, Agent, or Firm* — Fish & Richardson P.C.

(57) ABSTRACT

A vacuum glazing includes a vacuum layer formed between a first glazing and a second glazing, a spacer provided in the vacuum layer, a frame provided at edge portions of the first and second glazings, and a sealant interposed between the frame and surfaces of the first and second glazings to perform sealing of the vacuum layer. The insulating performance of the vacuum glazing is improved.

12 Claims, 30 Drawing Sheets

(56) References Cited

U.S. PATENT DOCUMENTS

| | | | | |
|---|---|---|---|---|
| 6,701,749 | B2* | 3/2004 | Wang | C03B 27/00 |
| | | | | 65/41 |
| 9,328,512 | B2* | 5/2016 | Francis, IV | E04C 2/34 |
| 9,732,552 | B2* | 8/2017 | Jones | E06B 3/6612 |
| 2006/0207218 | A1* | 9/2006 | Minaai | C03C 27/06 |
| | | | | 52/786.13 |
| 2010/0175347 | A1* | 7/2010 | Bettger | E06B 3/66371 |
| | | | | 52/788.1 |
| 2010/0178439 | A1 | 7/2010 | Bettger et al. | |
| 2013/0101759 | A1* | 4/2013 | Jones | E06B 3/6612 |
| | | | | 428/34 |
| 2013/0316099 | A1* | 11/2013 | Miller | E06B 3/66304 |
| | | | | 428/34 |
| 2014/0069034 | A1* | 3/2014 | Jones | E06B 3/585 |
| | | | | 52/171.3 |
| 2014/0072735 | A1* | 3/2014 | Jones | E06B 3/5814 |
| | | | | 428/34 |
| 2014/0162000 | A1* | 6/2014 | Son | C03C 3/066 |
| | | | | 428/34 |
| 2016/0089869 | A1* | 3/2016 | Parker | E06B 3/6775 |
| | | | | 156/104 |
| 2019/0210917 | A1* | 7/2019 | Park | C03C 27/10 |

FOREIGN PATENT DOCUMENTS

| | | |
|---|---|---|
| KR | 1020080030557 | 4/2008 |
| KR | 1020080077631 | 8/2008 |
| KR | 10-2009-0036709 | 4/2009 |
| KR | 20140037451 | 3/2014 |
| KR | 1020150046934 | 5/2015 |
| WO | WO2012058938 | 5/2012 |

\* cited by examiner

VACUUM GLAZING AND METHOD FOR MANUFACTURING THE SAME

CROSS-REFERENCE TO RELATED APPLICATIONS

The present application claims priority under 35 U.S.C. 119 and 35 U.S.C. 365 to Korean Patent Application No. 10-2017-0163726, filed on Nov. 30, 2017, which is hereby incorporated by reference in its entirety.

FIELD

The present disclosure relates to a vacuum glazing and a method for manufacturing the same.

BACKGROUND

Glass may be used for the door of a home appliance. For example, the glass may be used for the door of a refrigerator. If the glass is applied to the door of the refrigerator, a user has an advantage in that the user may easily see foods stored in the refrigerator through transparent glass without opening the door.

However, since the glass represents a lower insulating rate due to the intrinsic characteristic of the glass, chilly air stored in the refrigerator may be leaked to the outside through the glass. In particular, when the glass constitutes a glazing in a single layer, the lower insulating rate may be a more serious problem.

To compensate for the lower insulating rate, the glass may constitute a double glazing or a vacuum glazing including at least two glazings. The double glazing may be formed by injecting specific gas, which has a lower heat transfer coefficient, between the two glazings.

In addition, the vacuum glazing may be formed by making, in the vacuum state, the space between the two glazings. The vacuum glazing is more advantage than the double glazing in terms of an ability to block heat from being transferred to an inside or an outside of glass.

Regarding the vacuum glazing, there are introduced following related arts.

1. Korean Unexamined Patent Publication No. (publication date): 10-2009-0036709 (Apr. 15, 2009).
2. Title of disclosure: Vacuum window glass and method of fabricating the same The related art has the following problems.

First, as the thicker thickness of an adhesive (glass frit) for bonding the two glazings to each other is formed (to about 8 mm or more) to improve the adhesive force between two glazings, heat is transferred through the bonding part, thereby forming dew. In addition, an addition heater is required to prevent the dew from being produced.

Second, as the thicker vacuum layer is formed due to the thicker adhesive, the height of a spacer to support the two glazings between the two glazings is increased. Accordingly, the spacer may fall down or may not be stably installed in the manufacturing process of the vacuum glazing.

In addition, when the diameter of the spacer is increased to the above problem, the insulating performance of the vacuum glazing may be deteriorated.

SUMMARY

The present disclosure provides a vacuum glazing and a method for manufacturing the same, capable of improving insulating performance. In particular, the present disclosure provides a vacuum glazing capable of improving vacuum performance in an edge portion of a glazing.

In addition, the present disclosure provides a vacuum glazing and a method for manufacturing the same, capable of improving the bonding property and strength of a glazing by applying a metallic frame to a part (the bonding part) at which two glazings are bonded to each other.

Further, the present disclosure provides a vacuum glazing and a method for manufacturing the same, capable of lowering heat transfer at the bonding part by using a metallic frame having a lower heat transfer coefficient. In addition, the present disclosure provides a vacuum glazing, capable of reducing a heat transfer coefficient by suggesting the optimal shape of the frame and thus increasing the length of a heat transfer path.

Further, the present disclosure provides a vacuum glazing in which, as a metallic frame having a lower corrosion property is used, even if dew is produced at the bonding part, the metallic frame can be prevented from being corroded.

The present disclosure provides a vacuum glazing simply manufactured as a glazing is assembled with a frame having an adhesive. Further, the present disclosure provides a vacuum glazing and a method for manufacturing the same, in which a frame having an adhesive integrated thereto is mass-produced as separate component.

According to an aspect of the present disclosure, a vacuum glazing may include a vacuum layer formed between a first glazing and a second glazing, a spacer provided in the vacuum layer, a frame provided at edge portions of the first and second glazings, and a sealant interposed between the frame and surfaces of the first and second glazings to perform sealing of the vacuum layer. Accordingly, the insulating performance of the vacuum glazing may be improved.

The frame may include a metallic member, especially, a stainless material. Accordingly, the strength of the vacuum glazing may be improved, and the bonding property of the glazing may be improved.

The frame may be coupled to lateral side surfaces of the first and second glazings and may have a bent shape. Accordingly, the close contact property of the first and second glazings may be improved.

The frame may further include a third part coupling a first part to a second part and having a bent or a rounded shape. Accordingly, the frame may apply elasticity to the first and second glazings.

The first and second parts may be coupled to top and bottom surfaces of the first and second glazings, and the third part may be provided on lateral side surfaces of the first and second glazings. Accordingly, the bonding property between the first and second glazings may be improved.

A vacuum layer includes a frame insulating layer interposed between the lateral side surfaces of the first and second glazings and an inner surface of the third part.

Since the sealant is provided between the inner circumferential surface of the frame and the outer surfaces of the first and second glazings, the sealing effect of the vacuum glazing may be improved.

Since the sealant is provided between the frame and the top surface of the first glazing and between the frame and the bottom surface of the second glazing, the sealing effect of the vacuum glazing may be improved.

The first and second glazings may have a rectangular shape and the frame may include four frame parts corresponding to corners of the first and second glazings. Accordingly, the first and second glazings may be stably coupled to the frame.

Since the vertical width of the insulating layer is in the range of 0.18-0.22 mm, and the thickness of the frame is in the range of 0.2-1.0 mm, the insulating performance may be improved and the stiffness of the frame may be maintained.

Since each of parts of the first and second glazings, which are coupled to the frame, has a lateral-width (w) in a range of 3-10 mm, the sealant may be stably formed.

According to another aspect of the present disclosure, a method of a vacuum glazing includes installing a spacer on a top surface of a first glazing, covering a second glazing on the spacer, manufacturing a glazing assembly by coupling a frame including a metallic material to edge portions of the first glazing and the second glazing, sealing the first glazing and the second glazing and the frame by heating the glazing assembly, forming a vacuum layer in a space between the first glazing and the second glazing by performing pumping through an exhaust hole in the second glazing, and filling the exhaust hole with an exhaust finishing material.

As described above, according to the present disclosure, the frame and the adhesive may be assembled between the two glazings. Accordingly, the insulating performance of the vacuum glazing may be improved. In particular, the vacuum performance at the bonding part (the end portion) of the vacuum glazing, with which the frame is assembled, may be improved.

In addition, the frame may include the metallic material, so the bonding property of the glazing is improved. Accordingly, the strength in the bonding part may be improved.

In addition, the frame may include a stainless material having a lower heat transfer coefficient and a lower corrosion property. Accordingly, the vacuum glazing may be configured to represent the lower heat transfer at the bonding part and to represent a stronger property against moisture.

In addition, the frame is configured to surround the edge portions of the two glazings, so the length of the heat transfer path is increased through the frame. Accordingly, the heat transfer coefficient may be lowered at the bonding part.

In addition, the frame includes a plurality of parts which are bent or curved. Accordingly, the close contact property between two glazings may be improved.

Further, since the glazing may be assembled with the frame having the adhesive integrated thereto, the manufacturing method may be simplified and the frame may be mass produced.

DETAILED DESCRIPTION

Hereinafter, the detailed embodiment of the present disclosure will be described. The spirit of the present disclosure is not limited to the above embodiments. Those skilled in the art understanding the spirit of the present disclosure may easily suggest another embodiment within the range of the same spirit.

First Embodiment

Figure 1:
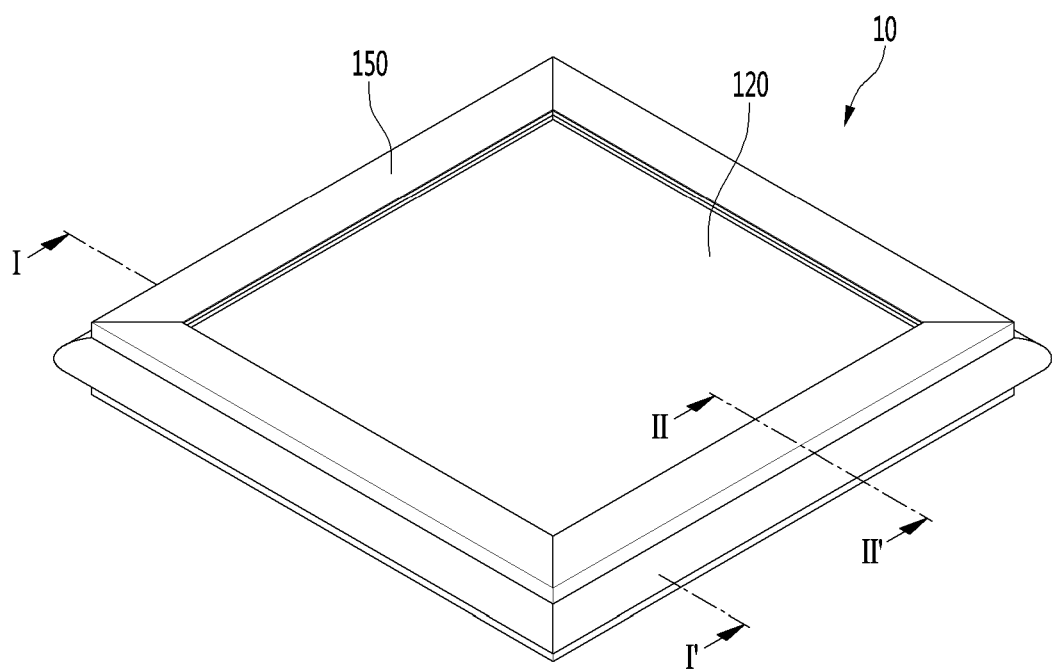
FIG. 1 is a perspective view illustrating the configuration of a vacuum glazing according to a first embodiment of the present disclosure.
Figure 2:
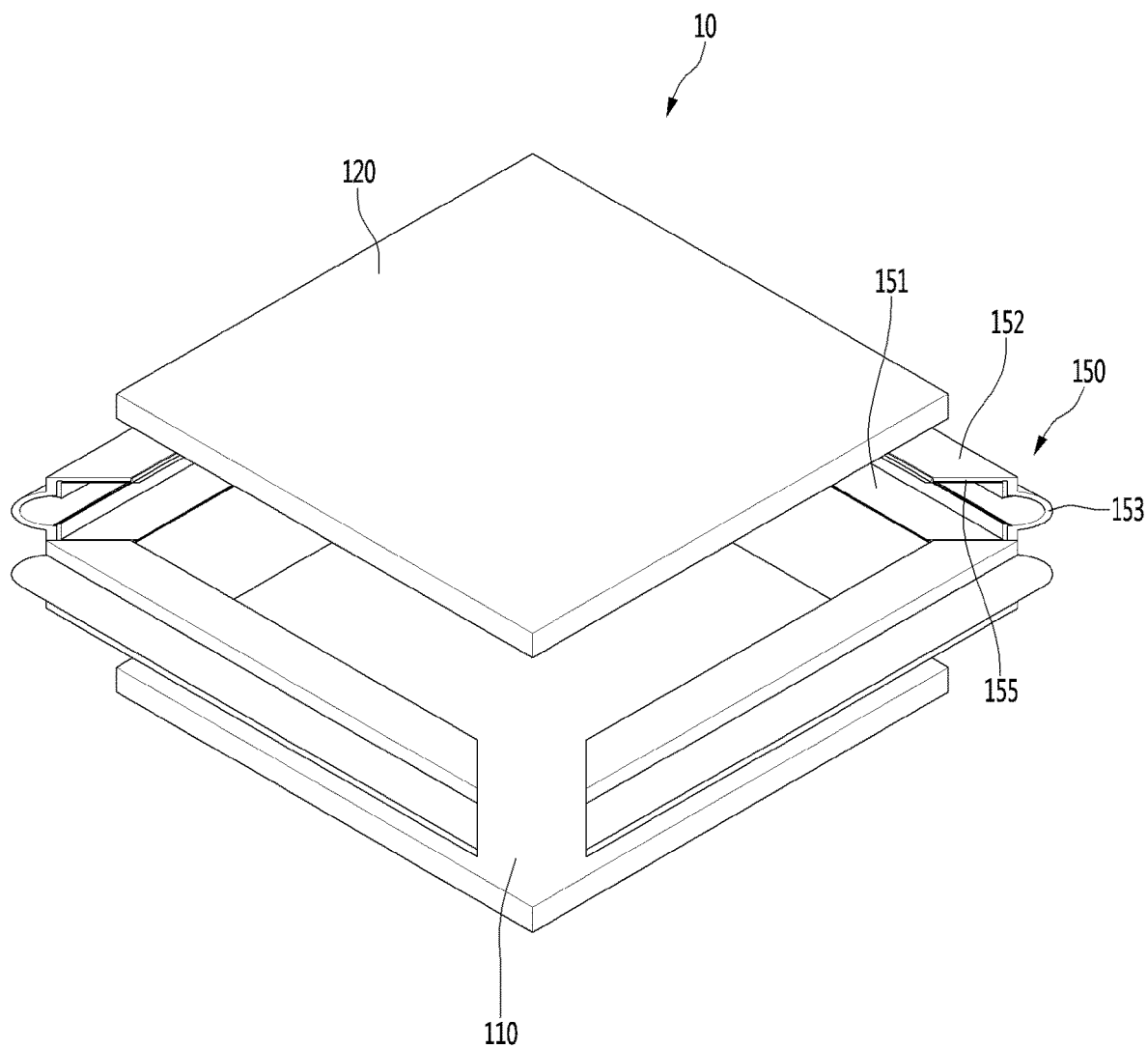
FIG. 2 is an exploded perspective view illustrating the configuration of the vacuum glazing according to the first embodiment of the present disclosure.
Figure 3:
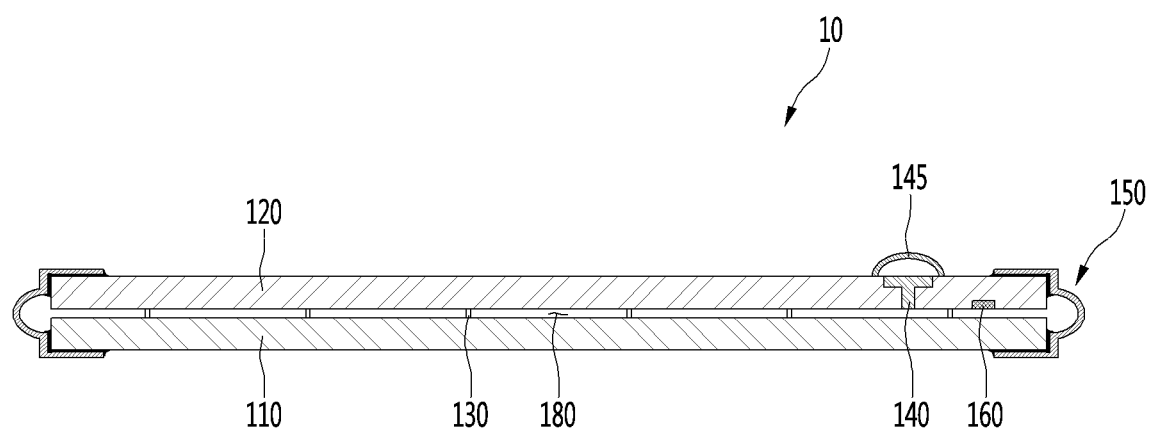
FIG. 3 is a sectional view taken along line I-I' of FIG. 1.
Figure 4:
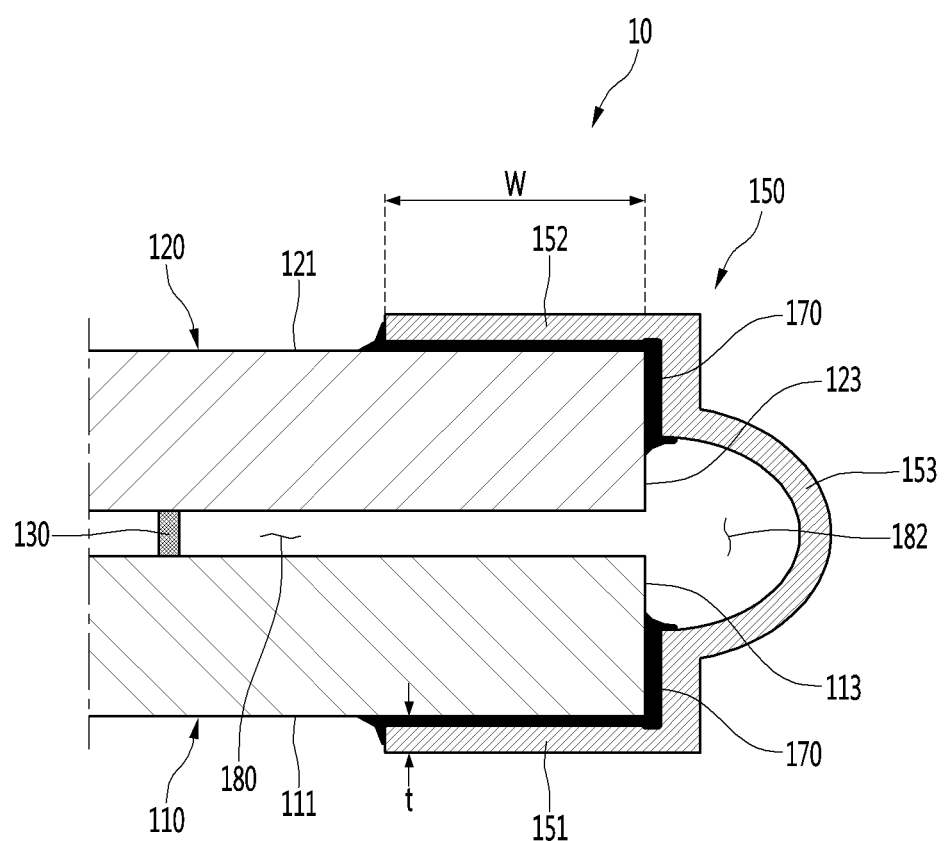
FIG. 4 is a sectional view taken along line II-II' of FIG. 1.

FIG. 1 is a perspective view illustrating the configuration of a vacuum glazing according to a first embodiment of the present disclosure, FIG. 2 is an exploded perspective view illustrating the configuration of the vacuum glazing according to the first embodiment of the present disclosure, FIG. 3 is a sectional view taken along line I-I' of FIG. 1, and FIG. 4 is a sectional view taken along line II-II' of FIG. 1.

Referring to FIGS. 1 to 4, a vacuum glazing 10 according to the first embodiment of the present disclosure may be used for a refrigerator door. A vacuum glazing 10 according to the second to fourth embodiment to be described below may be used for the refrigerator door.

The vacuum glazing 10 includes a plurality of glazings 110 and 120 and a frame 150 which is coupled to edge portions of the plurality of glazings 110 and 120 to seal the space between the plurality of glazings 110 and 120 such that the space between the plurality of glazings 110 and 120 is maintained in a vacuum state.

The plurality of glazings 110 and 120 include a first glazing 110 and a second glazing 120 provided at one side of the first glazing 110. Although the direction that the first and second glazings 110 and 120 are arranged may be varied depending on a viewing direction, the second glazing 120 may be provided above the first glazing 110 based on a drawing.

For example, when the vacuum glazing 10 is used for the refrigerator door, the second glazing 120 may be formed on the rear surface of the refrigerator door and the first glazing 110 may be formed on the front surface of the refrigerator.

The first glazing 110 and the second glazing 120 may be provided in the shape of a thin plate. For example, the thickness of the first glazing 110 or second glazing 120 may be formed in the range of 3.5-4.5 mm.

In addition, the first and second glazings 110 and 120 may have, for example, a rectangular shape. In addition, the first and second glazings 110 and 120 may be provided to have the same size or the same shape.

The frame 150 may seal the corners of the first and second glazings 110 and 120. In detail, the frame 150 includes a plurality of frame parts arranged along the edge portions of the first and second glazings 110 and 120. For example, the plurality of frame parts include four frame parts.

The four frame parts include a first frame part coupled to first corners of the first and second plate glazings 110 and 120, a second frame part coupled to second corners of the first and second plate glazings 110 and 120, a third frame part coupled to third corners of the first and second plate glazings 110 and 120, and a fourth frame part coupled to third corners of the first and second plate glazings 110 and 120

The first to fourth frame parts may have the same configuration and the same shape. The frame 150 may have the rectangular shape having an open inner portion depending on the arrangement of the first to fourth frame parts. In addition, coupling surfaces 155 may be formed on opposite side portions of each of the first frame part to the fourth frame part. The coupling surface 155 may be configured to extend while being inclined with respect to four corners of the first and second glazings 110 and 120.

The frame 150 includes a metallic member. For example, the metallic material may include a stainless material having a lower heat transfer coefficient. The stainless material has a characteristic representing excellent adhesion to a sealant 170 to be described.

As the frame 150 is formed of metal, the bonding property between the first and second glazings 110 and 120 and the frame 150 may be improved, and the strength may be improved between the first and second glazings 110 and 120, and the frame 150.

The first and second glazings 110 and 120 are spaced apart from each other in a vertical direction. A vacuum layer 180 may be formed in a space between the first and second glazings 110 and 120. In other words, the vacuum layer 180 may be formed between the top surface of the first glazing 110 and the bottom surface of the second glazing 120. The vertical width of the vacuum layer 180 may be formed in the range of about 0.18-0.22 mm, and the vacuum pressure of the vacuum layer 180 may be $10^{-3}$ Torr or less.

A spacer 130 may be interposed between the first and second glazings 110 and 120 to support the first and second glazings 110 and 120. The spacer 130 may be provided in the vacuum layer 180 and may have, for example, the substantially cylinder shape. The lower portion of the spacer 130 may be supported to the top surface of the first glazing 110, and the upper portion of the spacer 130 may support the bottom surface of the second glazing 120.

The spacer 130 may include a plurality of spacers 130. The diameter of the spacer 130 may be about 0.5 mm, and the distance between the plurality of spacers 130 may be about 25 mm.

An exhaust finishing member 140 is provided in the second glazing 120. Those skilled in the art understands that the exhaust finishing member 140 seals an exhaust hole 125 (see FIG. 5C) formed in the second glazing 120.

The exhaust hole 125 may be configured to exhaust gas present between the first and second glazings 110 and 120, such that the vacuum layer is formed between the first and second glazings 110 and 120. The exhaust hole 125 may be formed through the second glazing 120 in a vertical direction.

After the gas is exhausted through the exhaust hole 125, the exhaust finishing member 140 stops the exhaust hole 125. For example, the exhaust finishing member 140 may include glass frit having a lower melting point.

The vacuum glazing 10 may further include an exhaust cap 145 provided at an upper portion of the exhaust finishing member 140. The exhaust cap 145 may have a cap shape to cover the exhaust finishing member 140 and may include a metallic material. The exhaust cap 145 may prevent the external pressure of the vacuum glass 10 to be applied to the exhaust finishing member 140, thereby preventing the exhaust finishing member 140 from deviating from the exhaust hole 125 or preventing the exhaust finishing member 140 from being broken.

The vacuum glazing 10 further includes a gas adsorbent 160 (getter). Those skilled in the art may understand that the gas adsorbent 160 may include moisture or gas which may be generated in the procedure of manufacturing the vacuum glazing 10. In other words, even though the vacuum layer 180 is formed in the vacuum glazing 10, moisture or predetermined gas may be produced in the first and second glazings 110 and 120 or the spacer 130. The gas adsorbent 160 allows the gas to adsorb thereto, such that the vacuum layer 180 may be maintained in a vacuum state. For example, the gas adsorbent 160 may further include non-evaporable getter activated if current flows. After the vacuum glazing 10 is manufactured, power, which is supplied from the outside of the vacuum glazing 10, may be supplied to the gas adsorbent 160 through a wire.

The frame 150 may be coupled to the edge portions of the first and second glazings 110 and 120 such that the vacuum layer 10 may be easily maintained. In other words, the frame 150 may form an edge portion of the vacuum layer 180.

The four frame parts constituting the frame 150 include a first part 151, a second part 152, and a third part 153. The first part 151 and the second part 152 may be coupled to outer surfaces of the first and second glazings 110 and 120.

In detail, the first part 151 may have a bent shape and may be configured to be coupled between a bottom surface 111 and a first lateral side surface 113 of the first glazing 110. In addition, the second part 152 may have a bent shape and may be configured to be coupled to a top surface 121 and a second lateral side 123 of the second glazing 120.

The thickness of the frame 150, that is, the thickness (t) of the first to third parts 151, 152, and 153 may be formed in the range of 0.2-1.0 mm. If the thickness of the frame 150 is 0.2 mm or less, the frame 150 may be broken when the frame 150 is processed. In contrast, if the thickness 't' of the frame 150 is 1.0 mm or more, the heat transfer coefficient of the frame 150 is increased, so that the insulating performance of the vacuum glazing 10 may be lowered.

The left-right width of the frame 150, that is, the width 'w' of the bottom surface 111 of the first glazing 110, which is coupled to the first part 151, may be formed in the range of 3-10 mm. The width 'w' may be equal to the width of the top surface part 121 of the second glazing 120, which is coupled to the second part 152.

If the width 'w' of the frame 150 is formed to be 3 mm or less, the sealant 170 is not compressed in the space between the frame 150 and the first and second glazings 110 and 120 by the sufficient length. Accordingly, the sealing effect may be degraded. In contrast, if the width 'w' of the frame 150 is formed to be 10 mm or more, since heat may be excessively lost in the edge portions of the first and second glazings 110 and 120, the insulation performance may be degraded.

A sealant 170 may be further included in the vacuum glazing 10. The sealant 170 may be provided in the coupling part between the first part 151 and the first glazing 110, and the coupling part between the second part 152 and the second glazing 120.

In detail, the sealant 170 may be interposed between the first part 151 and the bottom surface 111 and between the first part 151 and the first lateral side surface 113. In detail, the sealant 170 may be interposed between the second part 152 and the top surface 121 and between the second part 152 and the second lateral side portion 123.

The sealant 170 may be provided in the state that the sealant 170 is attached to the frame 150. For example, the sealant 170 may be coated on the frame 150 and may include glass frit. When the frame 150 is heated after the frame 150 is coupled to the first and second glazings 110 and 120, the sealant 170 is melted to be compressed between the frame 150 and the first and second glazings 110 and 120. Through the configuration of the sealant 170, the effect of sealing the coupling part of the frame 150 may be increased.

The third part 153 is connected with the first and second parts 151 and 152 and may be positioned at the side portions of the first and second glazings 110 and 120. The third part 153 may have a bent or rounded shape. For example, the third part 153 may have a hemispheric shape. The frame 150 may apply elasticity to the first and second glazings 110 and 120 due to the shape of the third part 153, such that the first and second glazings 110 and 120 may make close contact with the upper and lower portion of the frame 150.

A frame vacuum layer 182 is formed among the first and second glazings 110 and 120 and the inner part of the third part 153. The frame vacuum layer 182 may communicate with the vacuum layer 180, and thus the volume of a vacuum layer provided in the vacuum glazing 10 is enlarged. In a broad sense, those skilled art may understand that the frame vacuum layer 182 constitutes at least a portion of the vacuum layer 180.

The length of the frame 150 may be relatively increased due to the configuration of the first to third parts 151, 152, and 153. Accordingly, the length of a heat transfer path may be increased due to the frame 150 and thus an amount of transferred heat may be reduced.

FIGS. 5A to 5F are views illustrating a method for manufacturing the vacuum glazing according to the first embodiment of the present disclosure. Hereinafter, the method for manufacturing the vacuum glazing according to the first embodiment will be described with reference to FIGS. 5A to 5F.

First, the first glazing 110 is provided. The first glazing 110 may be provided after the first glazing 110 is cleaned (see FIG. 5A).

The spacer 130 may be provided on the top surface of the first glazing 110. The spacer 130 may include a plurality of spacers and the plurality of spacers may be provided at preset distances. For example, the plurality of spacers 130 may be arranged in the form of a lattice (matrix). The plurality of spacers 130 may protrude from the top surface of the first glazing 110 (see FIG. 5B).

The second glazing 120 may be covered on the first glazing 110. If the second glazing 120 is disposed, upper portions of the plurality of spacers 130 may support the bottom surface of the second glazing 120.

The exhaust hole 125 may be formed in the second glazing 120 such that an exhaust tube 128 is coupled to the exhaust hole 125. As described above, those skilled in the art may understand the exhaust hole 125 as a component to form vacuum layers 180 and 182 by exhausting gas present between the first and second glazings 110 and 120. In addition, the gas adsorbent 160 may be provided on the bottom surface of the second glazing 120 (FIG. 5C).

After the first and second glazings 110 and 120 are arranged, the frame 150 may be installed at edge portions of the first and second glazings 110 and 120. The frame 150 may have the sealant 170 coated on the inner surface of the frame 150.

In detail, four frame parts constituting the frame 150 may be arranged at respective edge portions of the first and second glazings 110 and 120 and coupled to outer surfaces of the first and second glazings 110 and 120. In this case, the coupling surface 155 provided on opposite side portions of each frame part may be coupled to coupling surfaces of two adjacent frame parts.

After the frame 150 is assembled with the first and second glazings 110 and 120, the assembly (hereinafter, a glazing assembly) between the first and second glazings 110 and 120 and the frame 150 is heated. In this heating procedure, the sealant 170 is melted and compressed to seal the space between the first and second glazings 110 and 120 and the frame 150 (see FIG. 5D).

Thereafter, the exhaust tube 128 is coupled to the exhaust hole 125, and vacuum-pumping is performed through the exhaust tube 128. Accordingly, the vacuum layer 180 and the frame vacuum layer 182 may be formed (see FIG. 5E). After the vacuum layers 180 and 182 are formed, the exhaust hole 125 may be clogged by the exhaust finishing member 140, and an exhaust cap 145 may be coupled to an outer portion of the exhaust finishing member 140 (see FIG. 5F). The vacuum-pumping process and the process of coupling the exhaust finishing member 140 to the exhaust cap 145 may be performed in a vacuum chamber having a vacuum atmosphere. Through the manufacturing method, the vacuum glazing 10 may be easily manufactured.

Hereinafter, second to fourth embodiments of the present disclosure will be described. The above embodiments are different from the first embodiment in the configuration of the frame. Accordingly, the following description will be made while focusing on the difference, and the description of the same part as that of the first embodiment will be understood by citing the description of the first embodiment. In addition, the same part will be assigned with reference numerals of the first embodiment.

Figure 6:
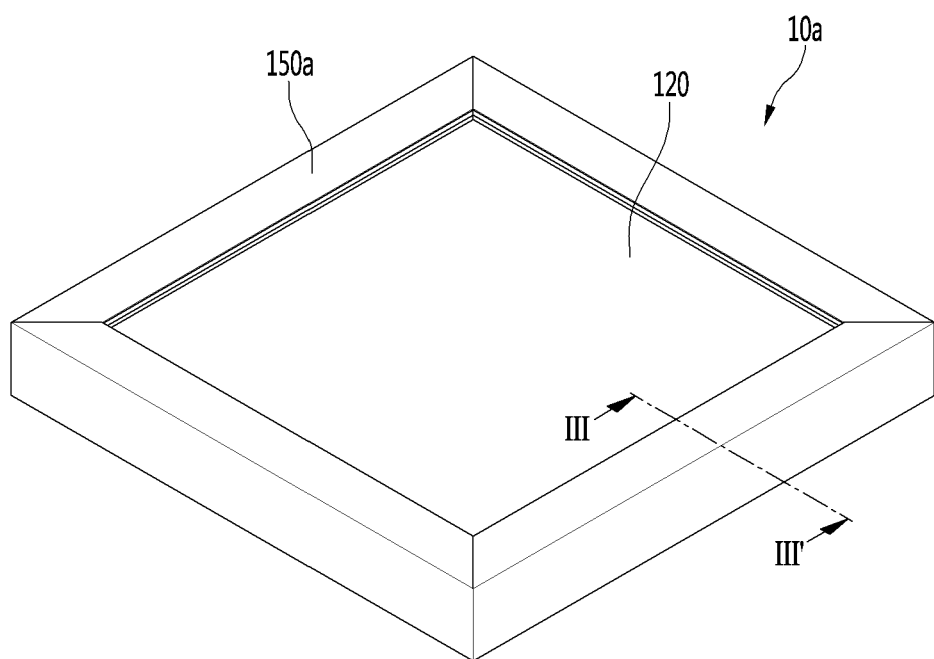
FIG. 6 is a perspective view illustrating the configuration of the vacuum glazing according to a second embodiment of the present disclosure.
Figure 7:
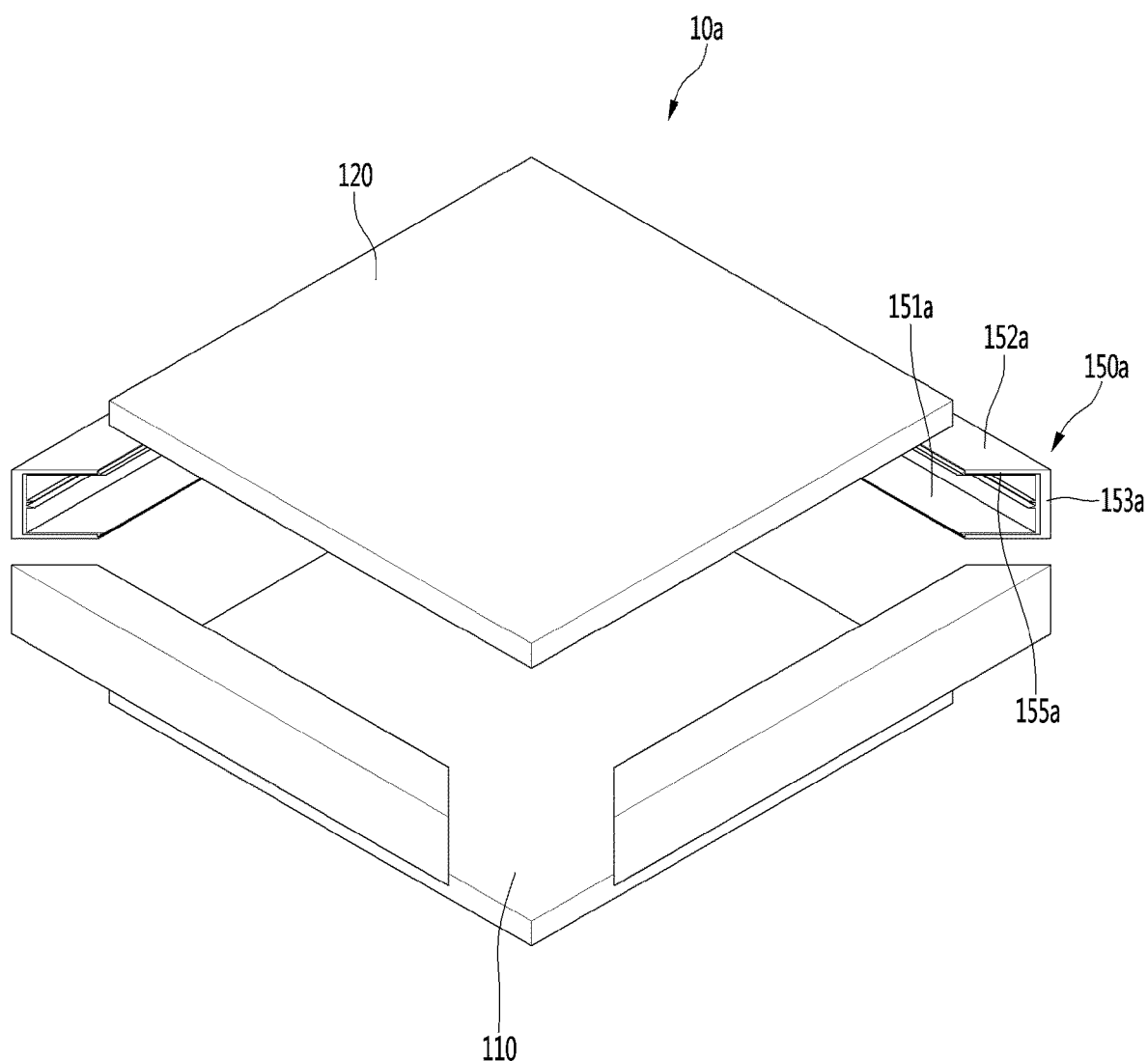
FIG. 7 is an exploded perspective view illustrating the configuration of the vacuum glazing according to the second embodiment of the present disclosure.
Figure 8:
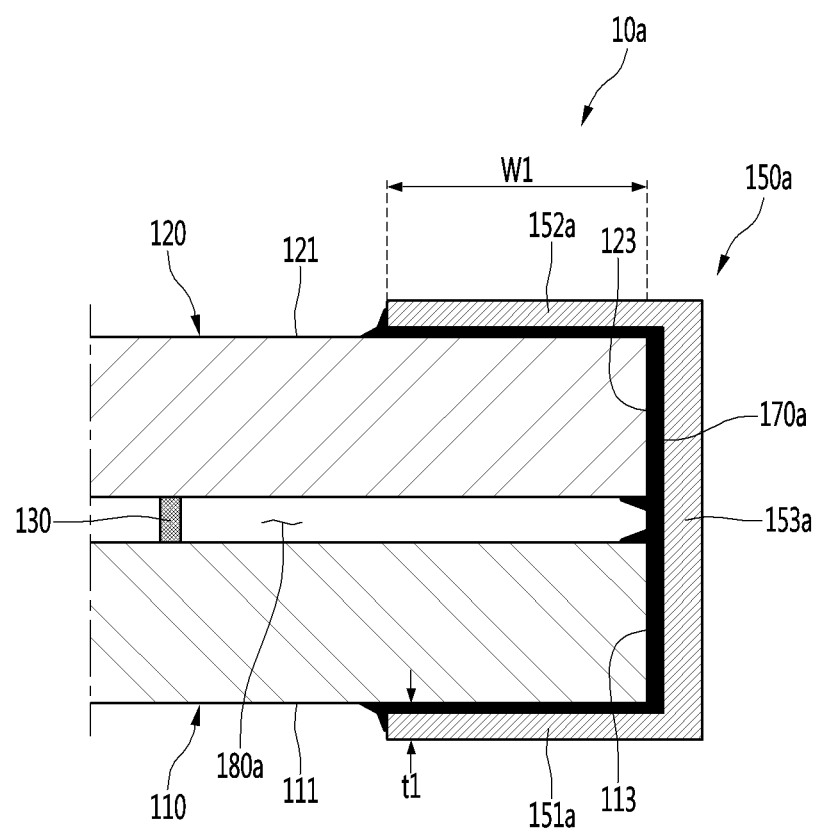
FIG. 8 is a sectional view taken along line III-III' of FIG. 6.

FIG. 6 is a perspective view illustrating the configuration of the vacuum glazing according to a second embodiment of the present disclosure, FIG. 7 is an exploded perspective view illustrating the configuration of the vacuum glazing according to the second embodiment of the present disclosure, FIG. 8 is a sectional view taken along line III-III' of FIG. 6, and FIGS. 9A to 9C are views illustrating a method for manufacturing the vacuum glazing according to the second embodiment of the present disclosure.

Referring to FIGS. 6 to 9C, according to the second embodiment of the present disclosure, a vacuum glazing 10a including a plurality of glazings 110 and 120 and a frame 150 which is coupled to edge portions of the plurality of glazings 110 and 120 to seal the space between the plurality of glazings 110 and 120 such that the space between the plurality of glazings 110 and 120 is maintained in a vacuum state.

The plurality of glazings 110 and 120 include a first glazing 110 and a second glazing 120. The description of the first and second glazings 110 and 120 will be understood by citing those of the first embodiment.

The frame 150a may be configured to seal corners of the first and second glazings 110 and 120. In detail, the frame 150a may include a plurality of frame parts arranged along the edge portions of the first and second glazings 110 and 120. For example, the plurality of frame parts include four frame parts.

The four frame parts include a first frame part coupled to first corners of the first and second plate glazings 110 and 120, a second frame part coupled to second corners of the first and second plate glazings 110 and 120, a third frame part coupled to third corners of the first and second plate glazings 110 and 120, and a fourth frame part coupled to fourth corners of the first and second plate glazings 110 and 120

The first to fourth frame parts may have the same configuration and the same shape. The frame 150a may have the rectangular shape having an open inner portion depending on the arrangement of the first to fourth frame parts. In addition, coupling surfaces 155a may be formed on opposite side portions of each of the first frame part to the fourth frame part and coupled two adjacent frame parts. The coupling surface 155a may be configured to extend while being inclined with respect to four edges of the first and second glazings 110 and 120.

The frame 150a may include a metallic material, for example, a stainless material. The details thereof will be understood by citing the description of the first embodiment.

The first and second glazings 110 and 120 are spaced apart from each other in a vertical direction, and a vacuum layer 180a may be formed in a space between the first and second glazings 110 and 120.

In addition, a spacer 130 may be interposed between the first and second glazings 110 and 120 to support the first and second glazings 110 and 120. The spacer 130 may be provided in the vacuum layer 180. The details of the spacer 130 may be understood by citing the description of the first embodiment.

The vacuum glazing 10a further includes an exhaust finishing member 140, an exhaust cap 145, and a gas adsorbent 160 provided on the second glazing 120. The details thereof may be understood by citing the description of the first embodiment.

The frame 150a may be coupled to edges of the first and second glazings 110 and 120 such that the vacuum layer 180 may be maintained in a vacuum state. In other words, the frame 150a may constitute the end portion of the vacuum layer 180a.

The plurality of frame parts constituting the frame 150a include a first part 151a, a second part 152a, and a third part 153a. The first part 151a, the second part 152a, and the third part 153a may be coupled to outer surfaces of the first and second glazings 110 and 120 and may have a linear plane shape. The frame 150a may have a bending shape of "⊏" through the configuration of the first to third parts 151a, 152a, and 153a.

In detail, the first part 151a may be configured to be coupled to a bottom surface 111 of the first glazing 110. In detail, the second part 152a may be configured to be coupled to a top surface 121 of the first glazing 120. In addition, the third part 153a may be configured to be coupled a first lateral side surface 113 of the first glazing 110 and a second lateral side surface 123 of the second glazing 120.

The thickness 't1' of the frame 150a, that is, the thickness 't1' of each of the first to third parts 151a, 152a, and 153a may be in the range of 0.2-1.0 mm. If the thickness 't1' of the frame 150a is formed to be 0.2 mm or less, the frame 150a may be broken when the frame 150a is processed. In contrast, if the thickness 't1' of the frame 150 may be configured to be 1.0 mm or more, the heat transfer coefficient of the frame 150 may be increased, so the insulating performance of the vacuum glazing 10 may be lowered.

The left-right width of the frame 150a, that is, the width 'w1' the bottom surface 111 of the first glazing 110, which is coupled to the first part 151a, may be formed in the range of 3-10 mm. The width 'w1' may be equal to the width of the top surface part 121 of the second glazing 120, which is coupled to the second part 152a.

If the width 'w' of the frame 150a is formed to be 3 mm or less, the sealant 170a is not compressed in the space between the frame 150a and the first and second glazings 110 and 120 by the sufficient length. Accordingly, the sealing effect may be degraded. In contrast, if the width 'w1' of the frame 150a is formed to be 10 mm or more, since heat may be excessively lost in the edge portions of the first and second glazings 110 and 120, the insulation performance may be degraded.

The sealant 170a may be further included in the vacuum glazing 10a. The sealant 170a may be interposed between inner surfaces of the first to third parts 151a, 152a, and 153a and outer surfaces of the first and second glazings 110 and 120.

In detail, the sealant 170a may be interposed between the first part 151a and the bottom surface 111 of the first glazing 110. In detail, the sealant 170a may be interposed between the first part 152a and the top surface 121 of the second glazing 120. In detail, the sealant 170a may be interposed between the third part 153a, and the first lateral side surface 113 and the second lateral side surface 123.

The configuration of the sealant 170a and the concept that the frame 150a having the sealant 170a is provided will be understood by citing the description of the first embodiment.

The length of the frame 150a may be relatively increased due to the configuration of the first to third parts 151a, 152a, and 153a. Accordingly, the length of a heat transfer path may be increased due to the frame 150a and thus an amount of transferred heat may be reduced.

Figure 9A:
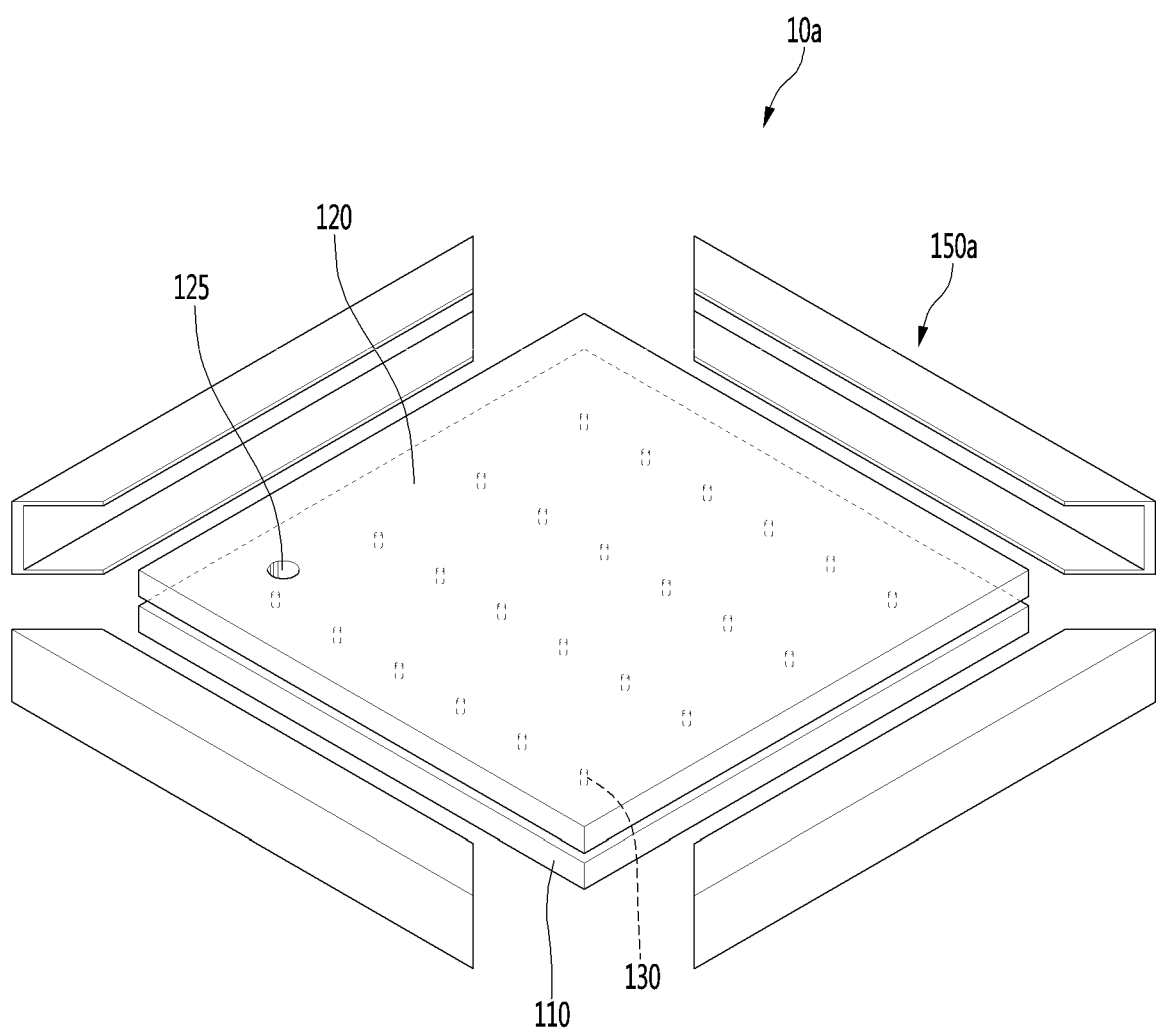
FIGS. 9A to 9C are views illustrating a method for manufacturing the vacuum glazing according to the second embodiment of the present disclosure.
Figure 9B:
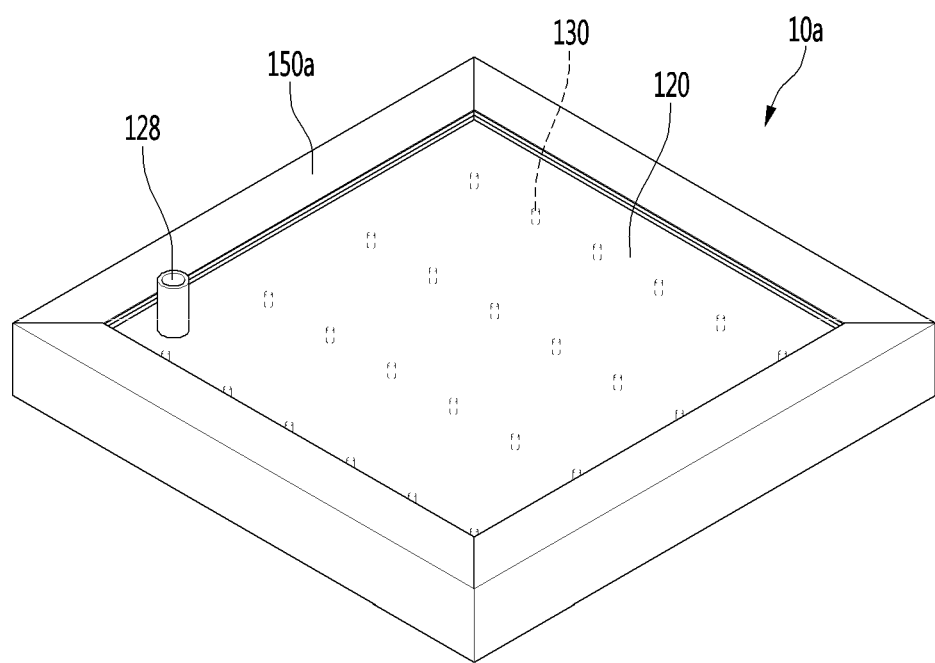

Hereinafter, the method for manufacturing the vacuum glazing according to the second embodiment will be described with reference to FIGS. 9A to 9C. The description of the manufacturing method made with reference to FIGS. 5A to 5C of the description according to the first embodiment will be cited.

Figure 5A:
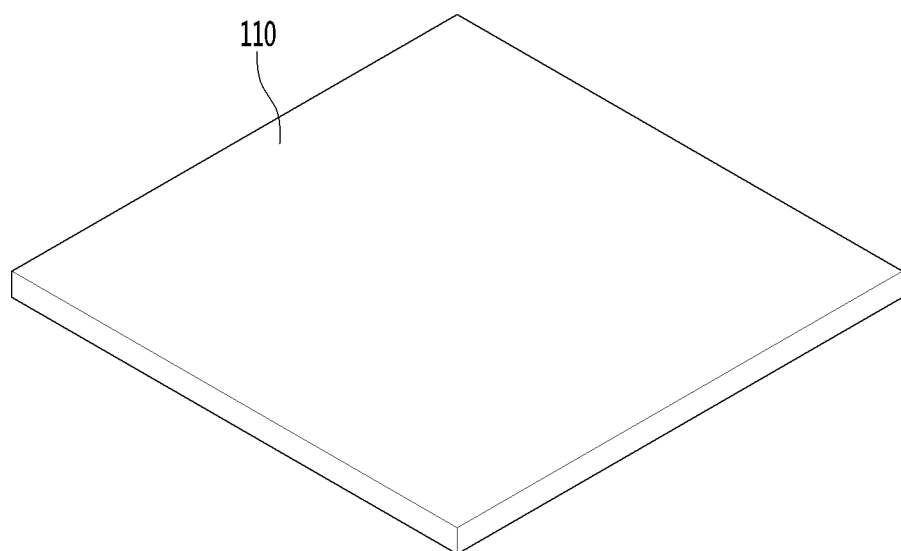
FIGS. 5A to 5F are views illustrating a method for manufacturing the vacuum glazing according to the first embodiment of the present disclosure.
Figure 5B:
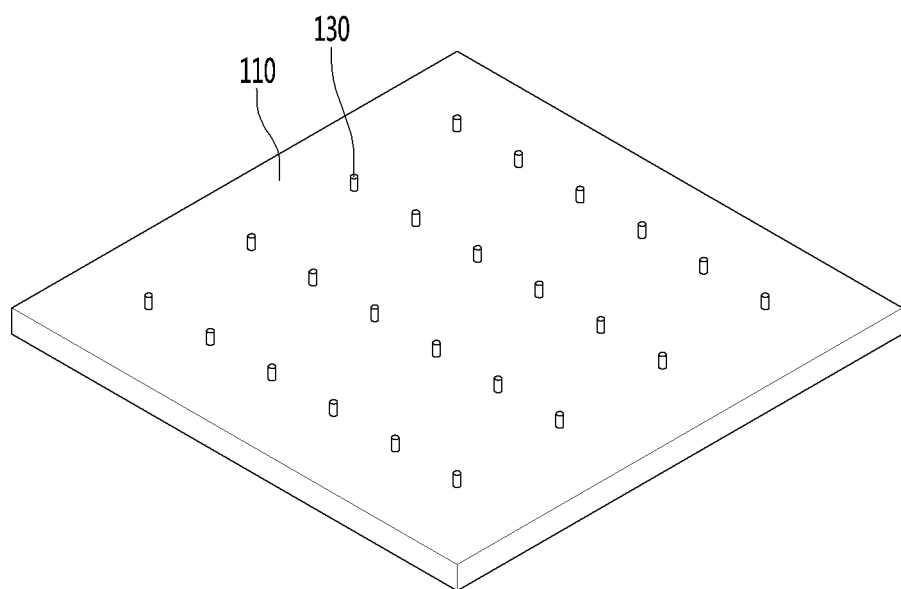
Figure 5C:
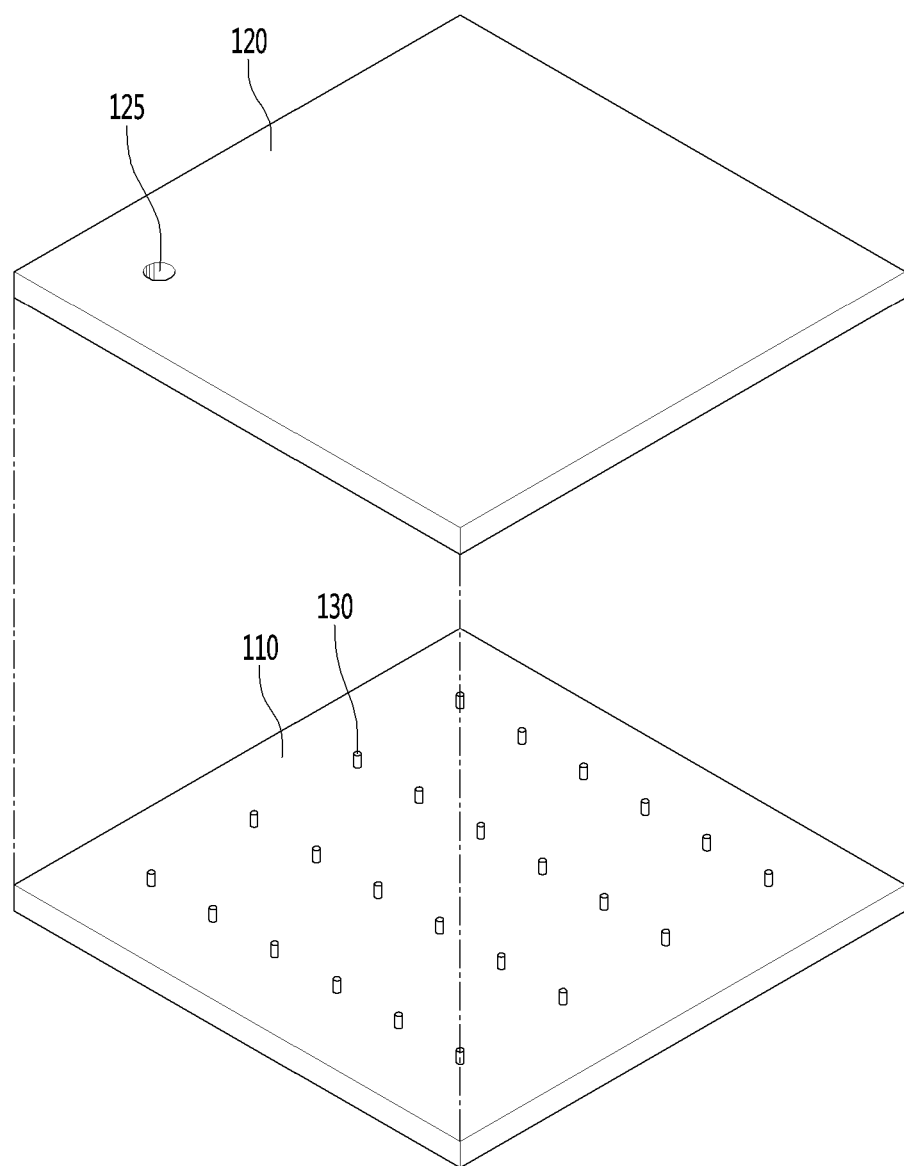
Figure 5D:
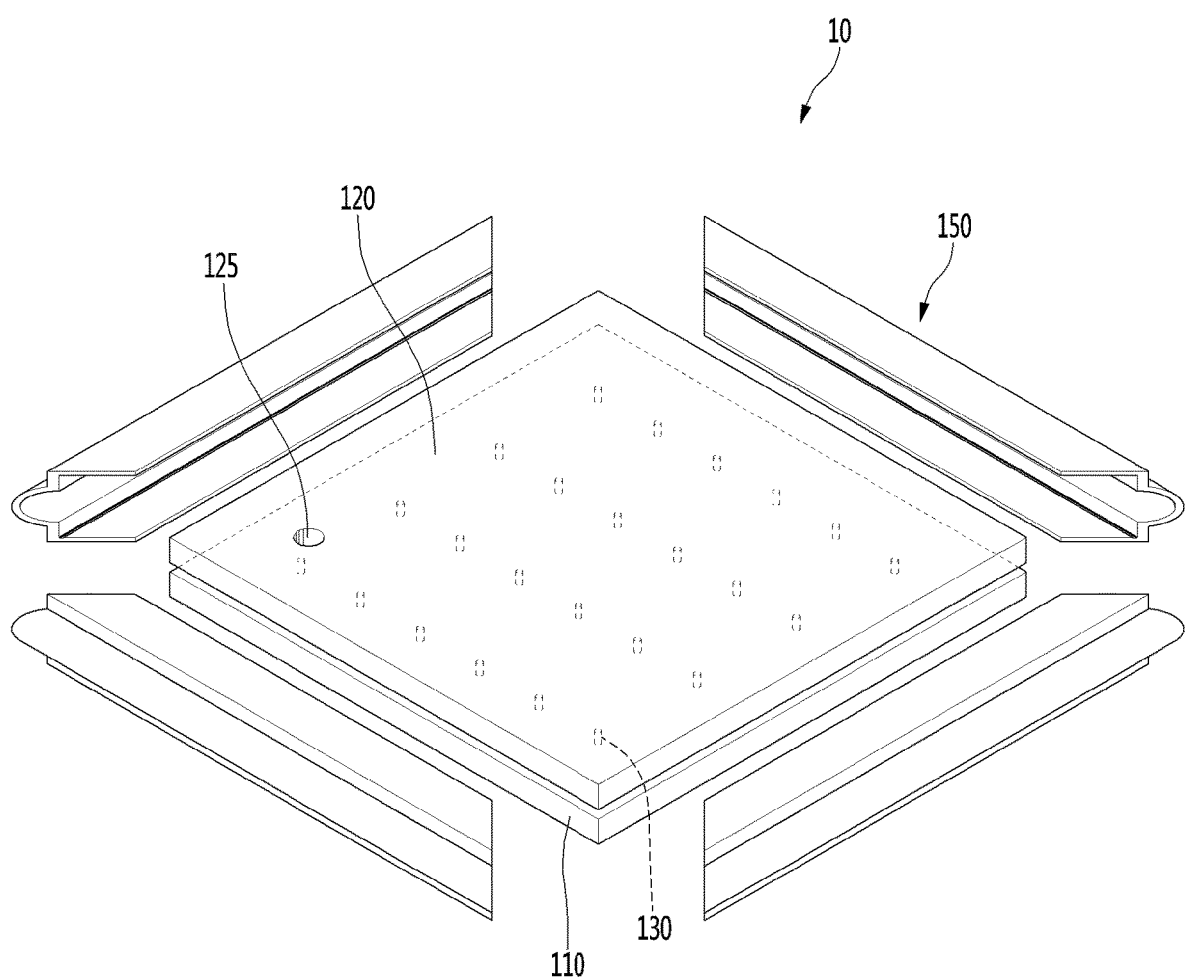
Figure 5E:
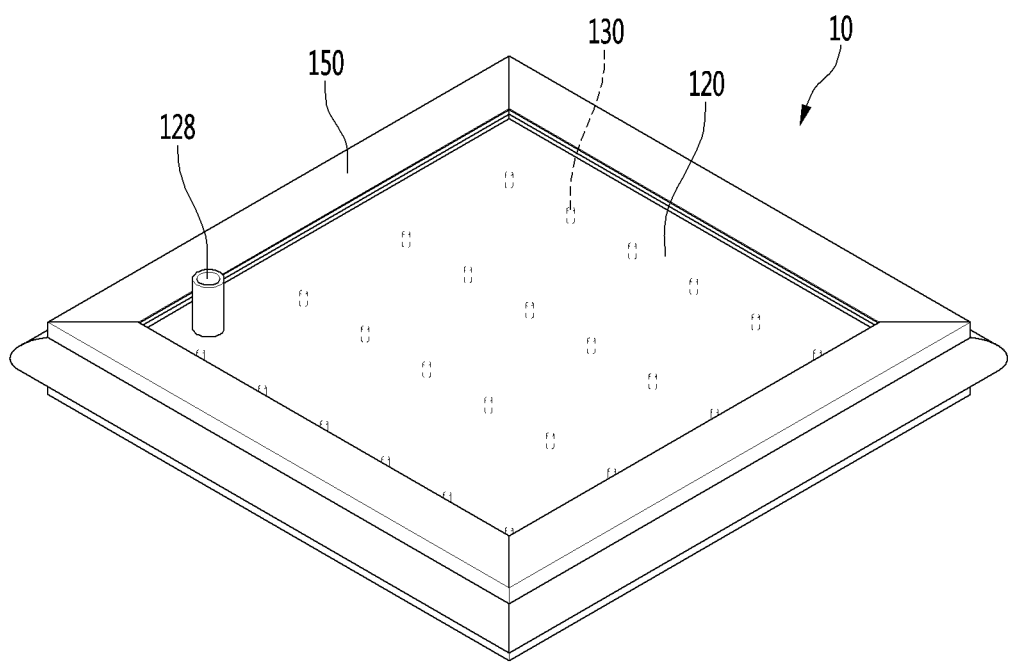

As shown in FIGS. 5A to 5C, a plurality of spacers 130 are installed on the first glazing 110 and the second glazing 120 is covered. Then, the frame 150a may be installed at the edge portions of the first and second glazings 110 and 120. The frame 150a may have the sealant 170a coated on the inner surface of the frame 150.

In detail, four frame parts constituting the frame 150a may be arranged at respective edge portions of the first and second glazings 110 and 120 and coupled to outer surfaces of the first and second glazings 110 and 120. In this case, the coupling surface 155a provided on opposite side portions of each frame part may be coupled to coupling surfaces of two adjacent frame parts.

After the frame 150a is assembled with the first and second glazings 110 and 120, the assembly (hereinafter, a glazing assembly) between the first and second glazings 110 and 120 and the frame 150a is heated. In this heating procedure, the sealant 170a is melted and compressed to seal the space between the first and second glazings 110 and 120 and the frame 150a (see FIG. 9A).

Thereafter, the exhaust tube 128 is coupled to the exhaust hole 125 formed in the second glazing 120, and vacuum-pumping is performed through the exhaust tube 128. Accordingly, the vacuum layer 180a may be formed (see FIG. 9B).

Figure 9C:
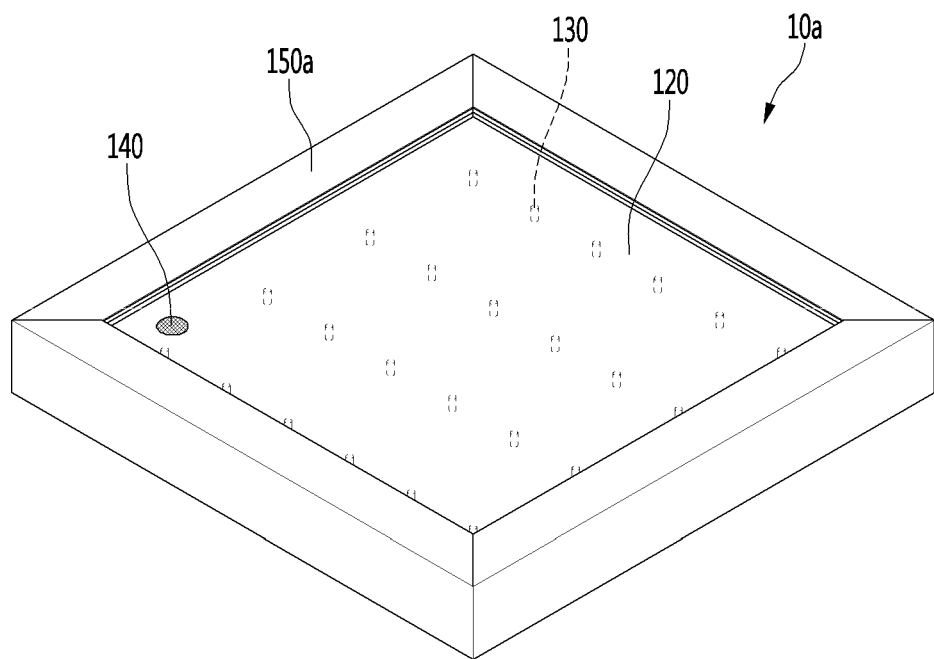

After the vacuum layer 180a is formed, the exhaust hole 125 is clogged by the exhaust finishing member 140, an exhaust cap 145 may be coupled to an outer portion of the exhaust finishing member 140 (see FIG. 9C). Through the manufacturing method, the vacuum glazing 10a may be easily manufactured.

Third Embodiment

Figure 10:
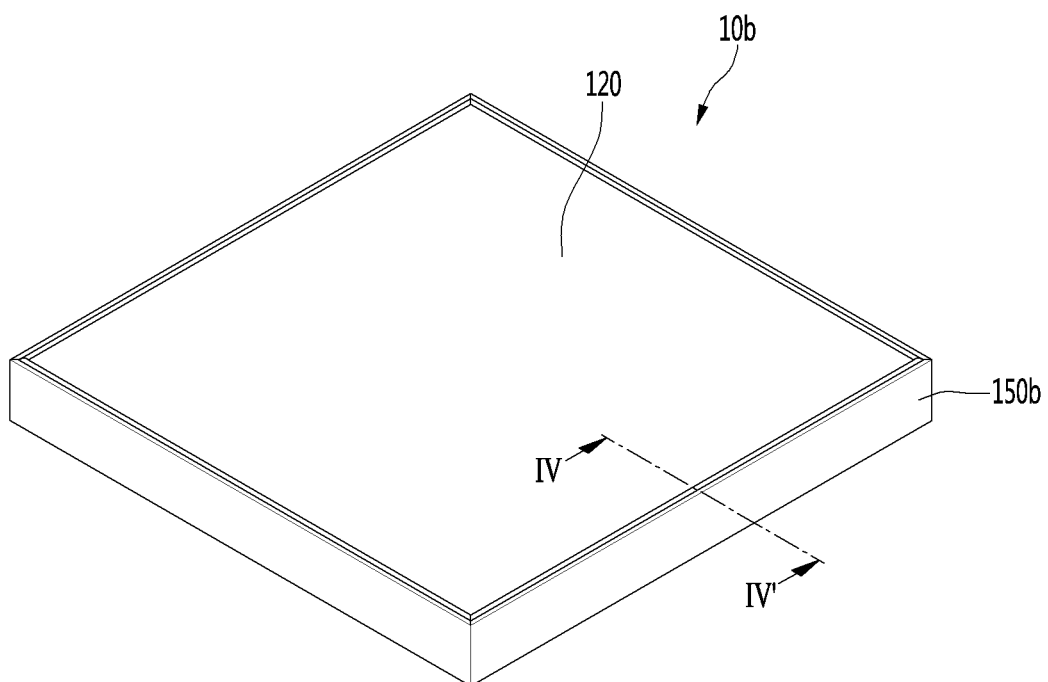
FIG. 10 is a perspective view illustrating the configuration of the vacuum glazing according to the third embodiment of the present disclosure.
Figure 11:
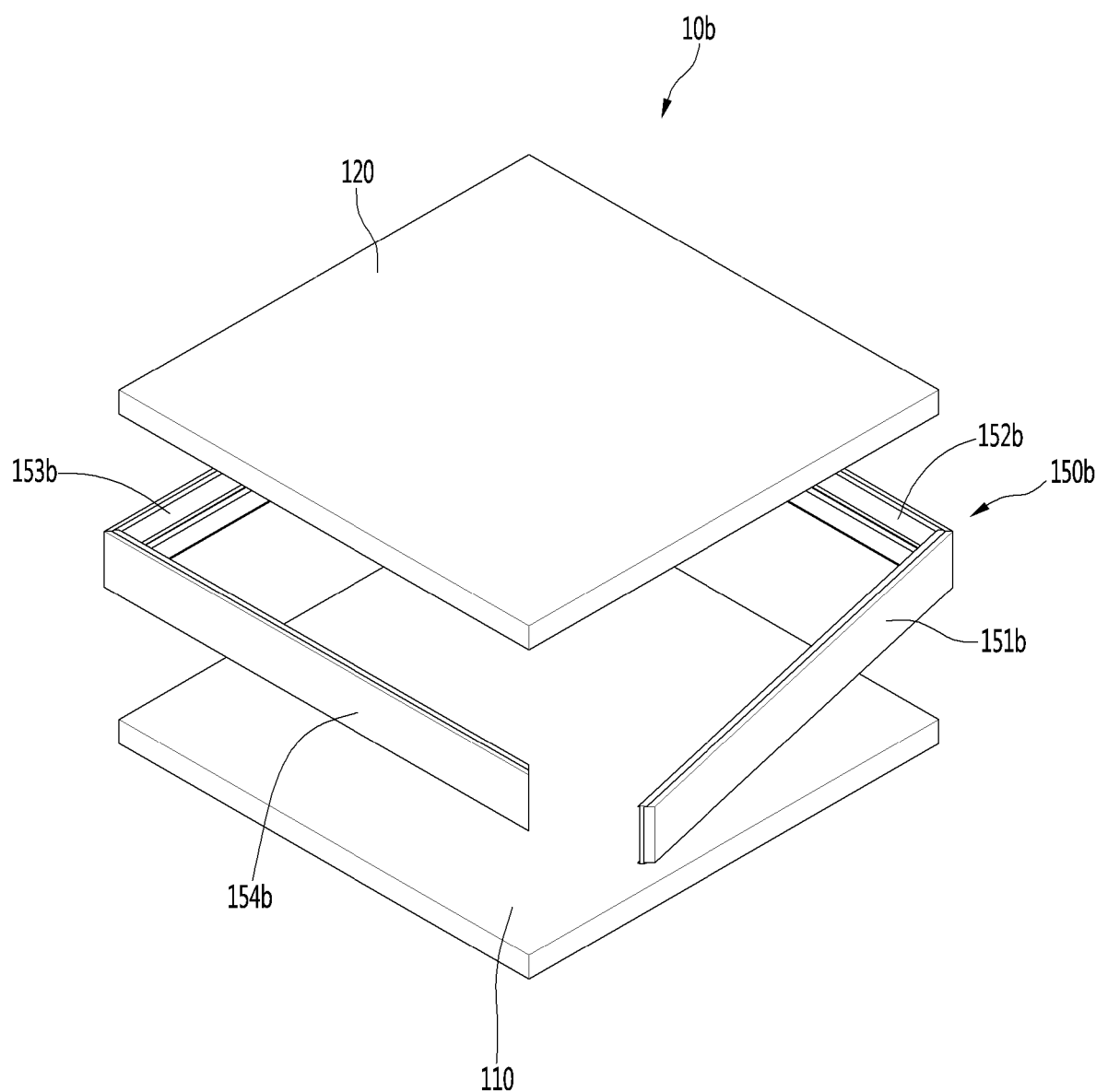
FIG. 11 is an exploded perspective view illustrating the configuration of the vacuum glazing according to the third embodiment of the present disclosure.
Figure 12:
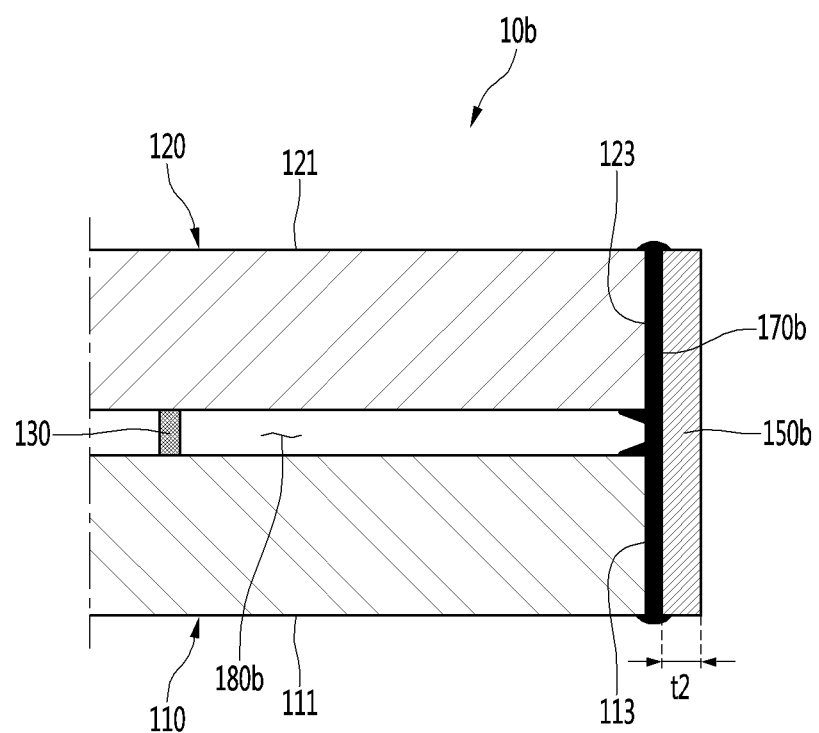
FIG. 12 is a sectional view taken along line IV-IV' of FIG. 10.

FIG. 10 is a perspective view illustrating the configuration of the vacuum glazing according to the third embodiment of the present disclosure, FIG. 11 is an exploded perspective view illustrating the configuration of the vacuum glazing according to the third embodiment of the present disclosure, FIG. 12 is a sectional view taken along line IV-IV' of FIG. 10, and FIGS. 13A to 13C are views illustrating a method for manufacturing the vacuum glazing according to the third embodiment of the present disclosure.

Referring to FIGS. 10 to 13C, according to the third embodiment of the present disclosure, a vacuum glazing 10b including a plurality of glazings 110 and 120 and a frame 150b which is coupled to edge portions of the plurality of glazings 110 and 120 to seal the space between the plurality of glazings 110 and 120 such that the space between the plurality of glazings 110 and 120 is maintained in a vacuum state.

The plurality of glazings 110 and 120 include a first glazing 110 and a second glazing 120. The description of the first and second glazings 110 and 120 will be understood by citing those of the first embodiment.

The frame 150b may be configured to seal corners of the first and second glazings 110 and 120. In detail, the frame 150b may include a plurality of frame parts 151b, 152b, 153b, and 154b arranged along the edge portions of the first and second glazings 110 and 120.

For example, the plurality of frame parts include four frame parts. In detail, the four frame parts include a first frame part 151b coupled to first corners of the first and second plate glazings 110 and 120, a second frame part 152b coupled to second corners of the first and second plate glazings 110 and 120, a third frame part 153b coupled to third corners of the first and second plate glazings 110 and 120, and a fourth frame part 154b coupled to fourth corners of the first and second plate glazings 110 and 120

The plurality of frame parts 151b, 152b, 153b, and 154b may be linked to each other. In addition, one side portion of the first frame part 151b may be separated from one side portion of the fourth frame part 151d. The frame 150b may have the shape bent several times. The first frame part 151b may be assembled with the fourth frame part 151d after the frame 150b is assembled with the first and second glazings 110 and 120.

The first to fourth frame parts 151b, 152b, 153b, and 154b may have the same configuration and the same shape. The frame 150a may have a rectangular shape having an open inner portion depending on the arrangement of the first to fourth frame parts.

The frame 150b may include a metallic material, for example, a stainless material. The details thereof will be understood by citing the description of the first embodiment.

The first and second glazings 110 and 120 are spaced apart from each other in a vertical direction, and a vacuum layer 180b may be formed in a space between the first and second glazings 110 and 120.

In addition, a spacer 130 may be interposed between the first and second glazings 110 and 120 to support the first and second glazings 110 and 120. The spacer 130 may be interposed in the vacuum layer 180. The details of the spacer 130 may be understood by citing the description of the first embodiment.

The vacuum glazing 10b further includes an exhaust finishing member 140, an exhaust cap 145, and a gas adsorbent 160 provided on the second glazing 120. The details thereof may be understood by citing the description of the first embodiment.

The frame 150a may be coupled to edges of the first and second glazings 110 and 120 such that the vacuum layer 180 may be maintained in a vacuum state. In other words, the frame 150a may constitute the edge portion of the vacuum layer 180a.

The first to fourth frame parts 151b, 152b, 153b, and 154b may be configured to be coupled to the first lateral side surface 113 of the first glazing 110 and the second lateral side surface 123 of the second glazing 120.

The thickness 't2' of the frame 150b may be in the range of 0.2-1.0 mm. If the thickness 't2' of the frame 150b is formed to be 0.2 mm or less, the frame 150b may be broken when the frame 150b is processed. In contrast, if the thickness 't2' of the frame 150b may be configured to be 1.0 mm or more, the heat transfer coefficient of the frame 150b may be increased so the insulating performance of the vacuum glazing 10b may be lowered.

The sealant 170b may be further included in the vacuum glazing 10b. The sealant 170b may be interposed between inner surfaces of the first to third parts 151b, 152b, 153b, and 154b and the outer surfaces of the first and second glazings 110 and 120.

In detail, the sealant 170b may be interposed between the inner circumferential surfaces of the parts 151b, 152b, 153b, and 154b of the frame 150 and the first lateral side surface 113 of the first glazing 110. In detail, the sealant 170b may be interposed between the inner circumferential surfaces of the parts 151b, 152b, 153b, and 154b of the frame 150 and the second lateral side surface 123 of the second glazing 120.

The configuration of the sealant 170b and the concept that the frame 150b having the sealant 170b is provided will be understood by citing the description of the first embodiment.

According to the configuration of the first to fourth frame parts 151b, 152b, 153b, and 154b, since the frame 150b is provided only the lateral side surfaces of the first and second glazings 110 and 120, the top surface and the bottom surface of the first and second glazings 110 and 120, that is, the front surface and the rear surface of the refrigerator door (when the top surface and the bottom surface of the first and second glazings 110 and 120 are used for the front surface and the rear surface of the refrigerator door) may have smooth surfaces. In addition, the interference with another component is not made and a beautiful outer appearance is obtained.

Figure 13A:
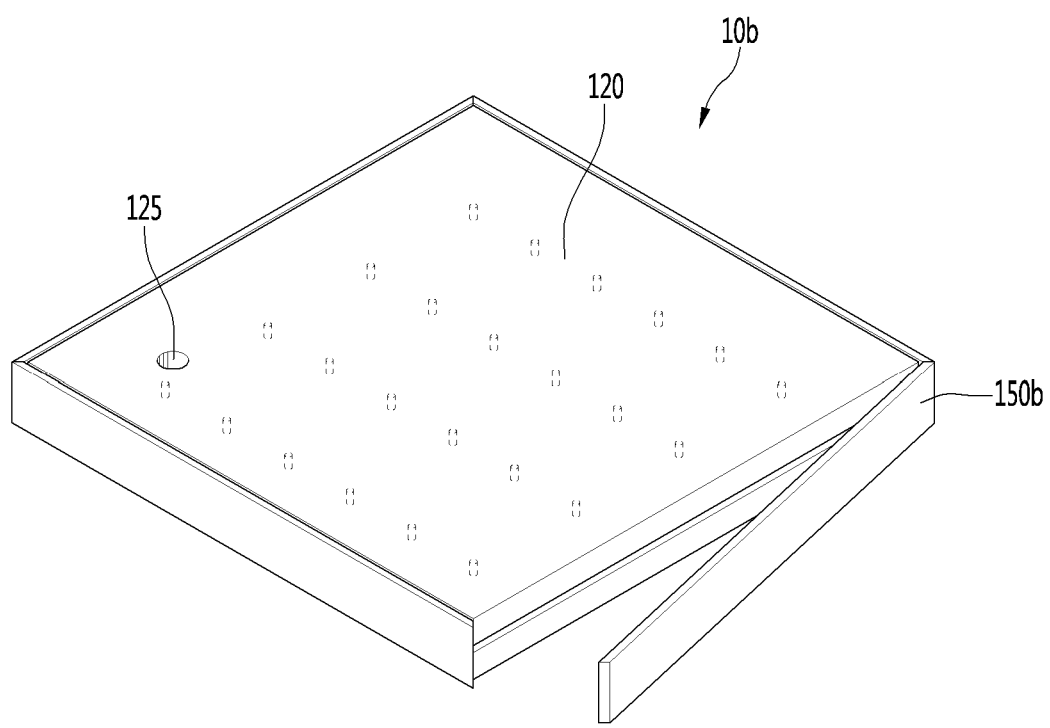
FIGS. 13A to 13C are views illustrating a method for manufacturing the vacuum glazing according to the third embodiment of the present disclosure.
Figure 13B:
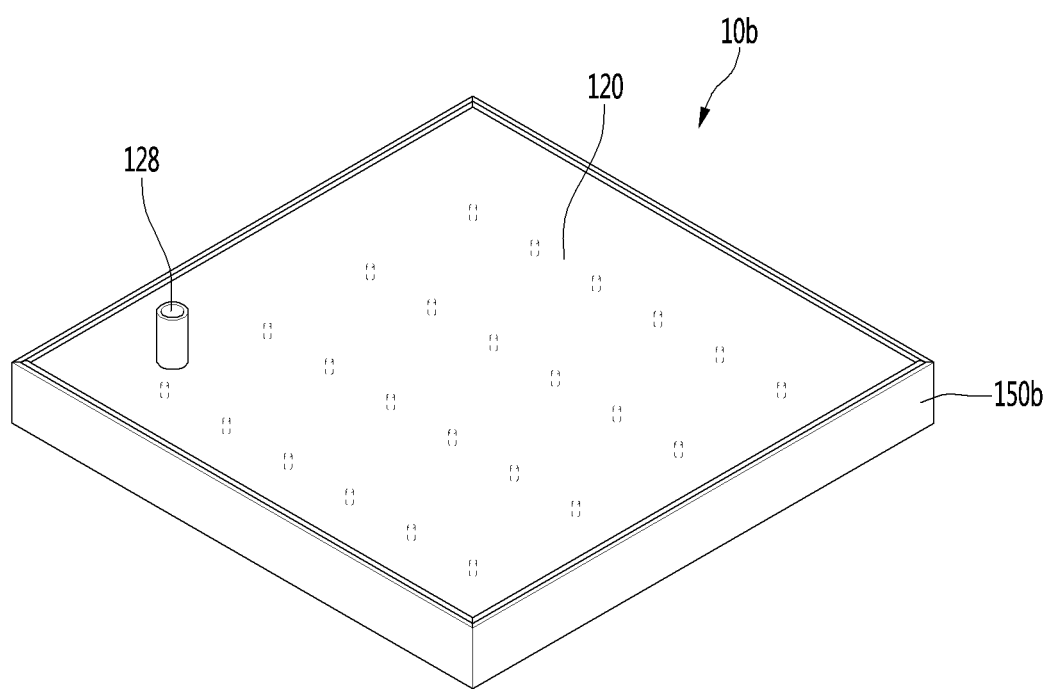
Figure 13C:
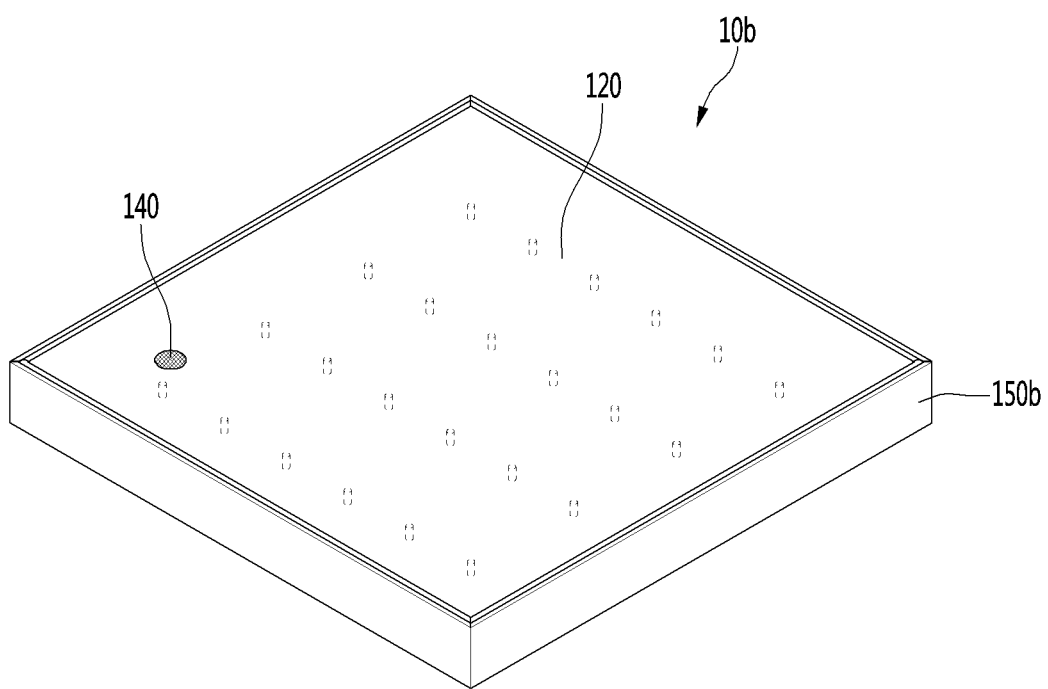

Hereinafter, the method for manufacturing the vacuum glazing according to the third embodiment will be described with reference to FIGS. 13A to 13C. The description of the manufacturing method made with reference to FIGS. 5A to 5C of the description according to the first embodiment will be cited in the present embodiment.

As shown in FIGS. 5A to 5C, a plurality of spacers 130 are installed on the first glazing 110 and the second glazing 120 is covered. Then, the frame 150b may be installed at the edge portions of the first and second glazings 110 and 120. The frame 150 may have the sealant 170b coated on the inner surface of the frame 150b.

In detail, four frame parts 151b, 152b, 153b, and 154b constituting the frame 150a may be arranged at respective edge portions of the first and second glazings 110 and 120 and coupled to outer surfaces of the first and second glazings 110 and 120.

After the frame 150b is assembled with the first and second glazings 110 and 120, the assembly between the first and second glazings 110 and 120 and the frame 150b is heated. In this heating procedure, the sealant 170b is melted and compressed to seal the space between the first and second glazings 110 and 120 and the frame 150b (see FIG. 13A).

Thereafter, the exhaust tube 125 is coupled to the exhaust hole 125 formed in the second glazing 120, and vacuum-pumping is performed through the exhaust tube 128. Accordingly, the vacuum layer 180b may be formed (see FIG. 13B).

Figure 5F:
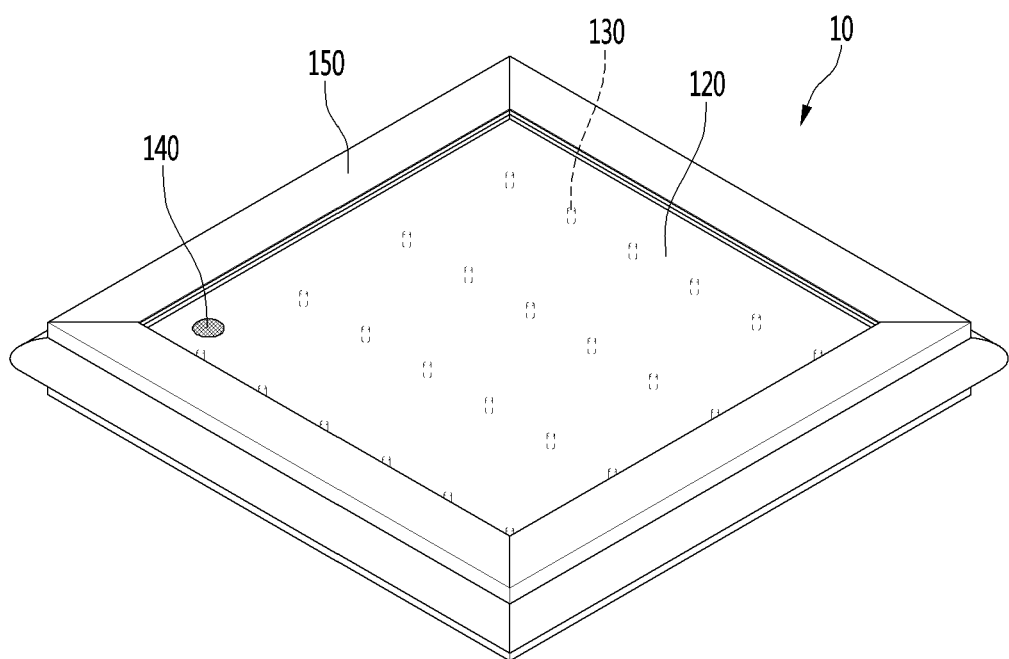

After the vacuum layer 180b is formed, the exhaust hole 125 is clogged by the exhaust finishing member 140, an exhaust cap 145 may be coupled to an outer portion of the exhaust finishing member 140 (see FIG. 5F). Through the manufacturing method, the vacuum glazing 10b may be easily manufactured.

Fourth Embodiment

Figure 14:
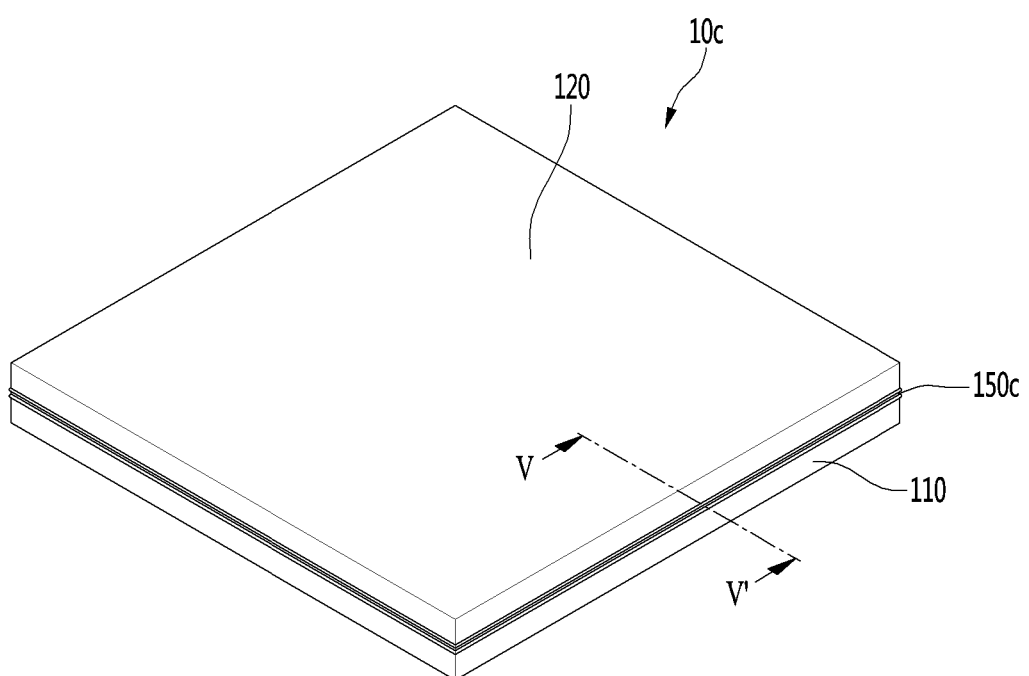
FIG. 14 is a perspective view illustrating the configuration of the vacuum glazing according to a fourth embodiment of the present disclosure.
Figure 15:
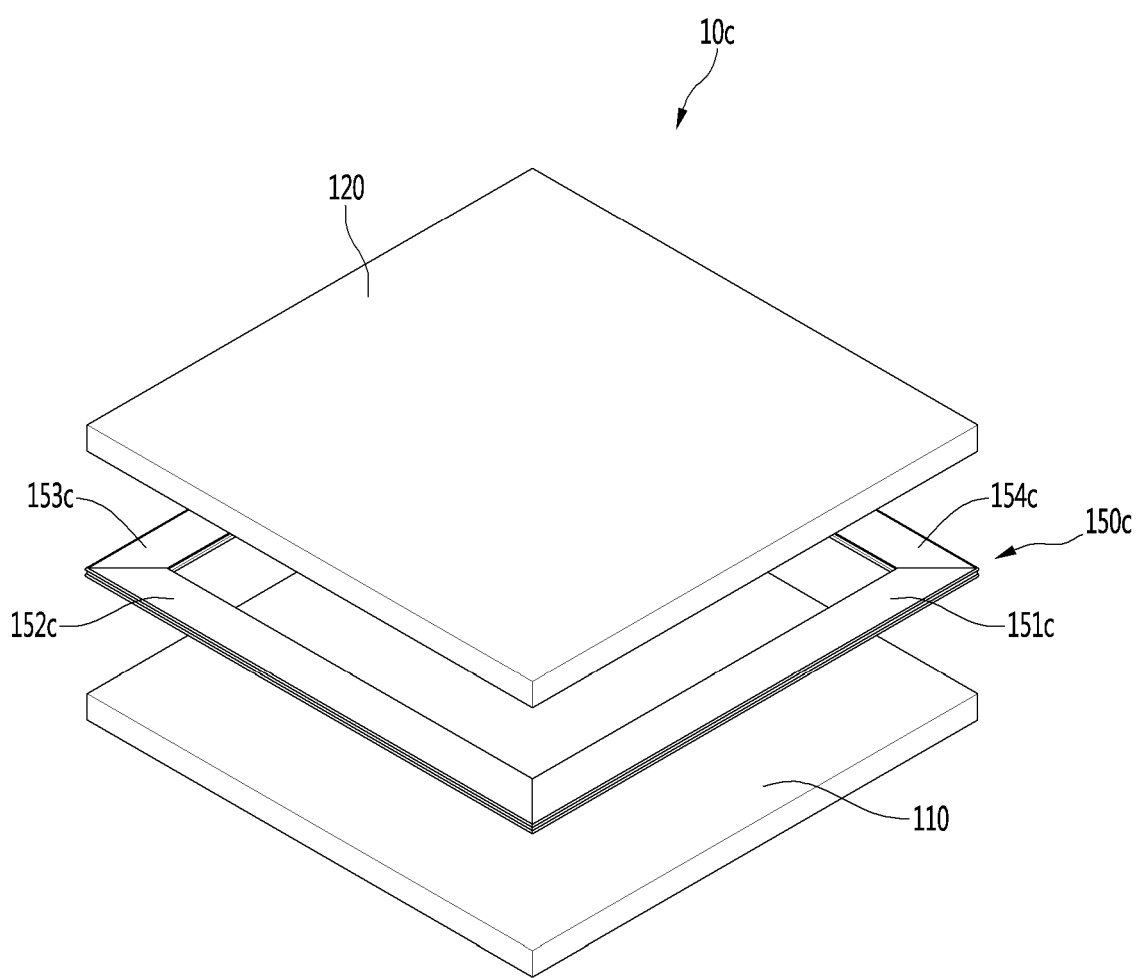
FIG. 15 is an exploded perspective view illustrating the configuration of the vacuum glazing according to the fourth embodiment of the present disclosure.
Figure 16:
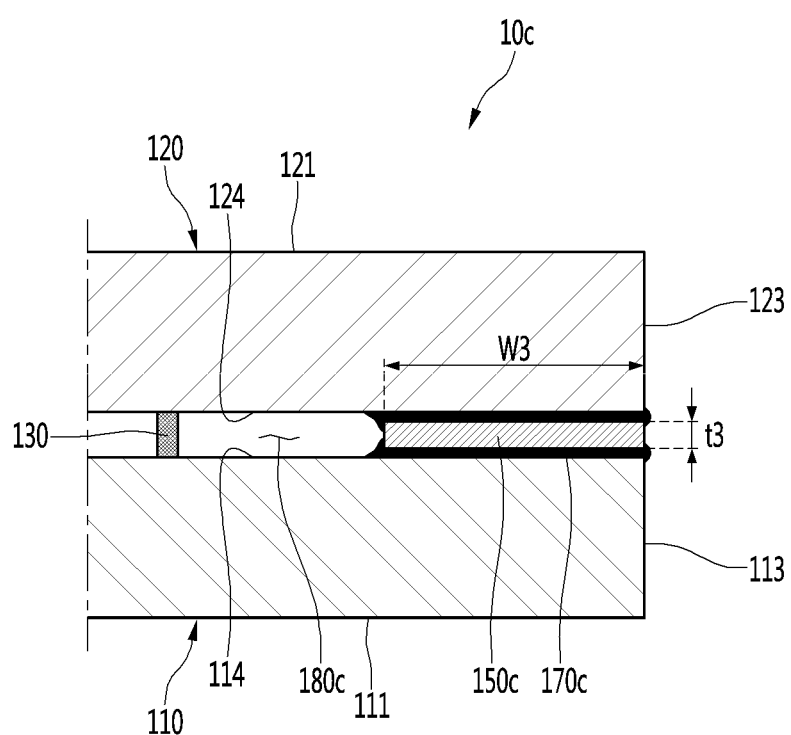
FIG. 16 is a sectional view taken along line V-V' of FIG. 14.

FIG. 14 is a perspective view illustrating the configuration of the vacuum glazing according to a fourth embodiment of the present disclosure and FIG. 15 is an exploded perspective view illustrating the configuration of the vacuum glazing according to the fourth embodiment of the present disclosure. FIG. 16 is a sectional view taken along line V-V' of FIG. 14, and FIGS. 17A to 17D are views illustrating a method for manufacturing the vacuum glazing according to the third embodiment of the present disclosure.

Referring to FIGS. 14 to 17D, according to the fourth embodiment of the present disclosure, a vacuum glazing 10c including a plurality of glazings 110 and 120 and a frame 150c which is interposed between the plurality of glazings 110 and 120 to seal the space between the plurality of glazings 110 and 120 such that the space between the plurality of glazings 110 and 120 is maintained in a vacuum state.

The plurality of glazings 110 and 120 include the first glazing 110 and the second glazing 120. The description of the first and second glazings 110 and 120 will be understood by citing those of the first embodiment.

The frame 150c is compressed between the first and second glazings 110 and 120 to seal the space between the first and second glazings 110 and 120. In detail, the frame 150c includes a plurality of frame parts 151c, 152c, 153c, and 154c. The plurality of frame parts 151c, 152c, 153c, and 154c may be linked to each other. The frame 150c may have the shape bent several times.

The first to fourth frame parts 151c, 152c, 153c, and 154c may have mutually different configurations and shapes. The frame 150c may have the shape of a rectangular frame having an open inner portion depending on the arrangement of the first to fourth frame parts.

The frame 15c may include a metallic material, for example, a stainless material. The details thereof will be understood by citing the description of the first embodiment.

The first and second glazings 110 and 120 are spaced apart from each other in a vertical direction, and a vacuum layer 180c may be formed in a space between the first and second glazings 110 and 120.

In addition, a spacer 130 may be interposed between the first and second glazings 110 and 120 to support the first and second glazings 110 and 120. The spacer 130 may be interposed in the vacuum layer 180c. The details of the spacer 130 may be understood by citing the description of the first embodiment.

The vacuum glazing 10a further includes an exhaust finishing member 140, an exhaust cap 145, and a gas adsorbent 160 provided on the second glazing 120. The details thereof may be understood by citing the description of the first embodiment.

The frame 150c may be coupled to edge portions of the first and second glazings 110 and 120 such that the vacuum layer 180 may be maintained in a vacuum state. In other words, the frame 150c may constitute the edge portion of the vacuum layer 180c.

The first to fourth frame parts 151c, 152c, 153c, and 154c may be configured to be coupled to the first lateral side surface 114 of the first glazing 110 and the second lateral side surface 124 of the second glazing 120.

The thickness 't3' of the frame 150c may be in the range of 0.1-1.0 mm. If the thickness of the frame 150c is formed to be 0.1 mm or less, the vertical width of the vacuum layer 18c is significantly reduced and thus the insulating performance is degraded. In contrast, if the thickness 't3' of the frame 150c may be configured to be 1.0 mm or more, the heat transfer coefficient of the frame 150 may be increased so the insulating performance of the vacuum glazing 10 may be lowered.

The left-right width of the frame 150c, that is, the width 'w3' of a top surface 114 of the first glazing 110, which is coupled to the frame 150c, may be formed in the range of 3-10 mm. The width 'w3' may be the width of the bottom surface 124 of the second glazing 120 couple to the frame 150c.

If the width 'w' of the frame 150c is formed to be 3 mm or less, the sealant 170c is not compressed in the space between the frame 150c and the first and second glazings 110 and 120 by the sufficient length. Accordingly, the sealing effect may be degraded. In contrast, if the width 'w3' of the frame 150c is formed to be 10 mm or more, since heat may be excessively lost in the edges of the first and second glazings 110 and 120, the insulation performance may be degraded.

The sealant 170c may be further included in the vacuum glazing 10c. The sealant 170c may be provided between bottom surfaces of the first to fourth frame parts 151c, 152c, 153c, and 154c and the top surface 114 of the first glazing 110, and may be provided between top surfaces of the first to fourth frame parts 151c, 152c, 153c, and 154c and the bottom surface 124 of the second glazing 120.

The configuration of the sealant 170c and the concept that the frame 150c having the sealant 170c is provided will be understood by citing the description of the first embodiment.

According to the configuration of the first to fourth frame parts 151c, 152c, 153c, and 154c, since the frame 150c may be interposed between the first and second glazings 110 and 120, the frame 150c may not be exposed out of the first and second glazings 110 and 120. Accordingly, when the vacuum glazing 10c is used for the refrigerator door, the front surface and the rear surface of the door may be smooth. In addition, the interface with another component may not be made and the beautiful outer appearance may be made.

Hereinafter, the method for manufacturing the vacuum glazing according to the fourth embodiment will be described with reference to FIGS. 17A to 17D. The description of the manufacturing method made with reference to FIGS. 5A and 5B of the description according to the first embodiment will be cited in the present embodiment.

As illustrated in FIGS. 5A and 5B, after a plurality of spacers 130 are installed on the first glazing 110, the frame 150c may be installed on the edge of the top surface of the first glazing 110. The frame 150c may have a sealant 170c coated on the frame 150c (see FIG. 17A).

Figure 17A:
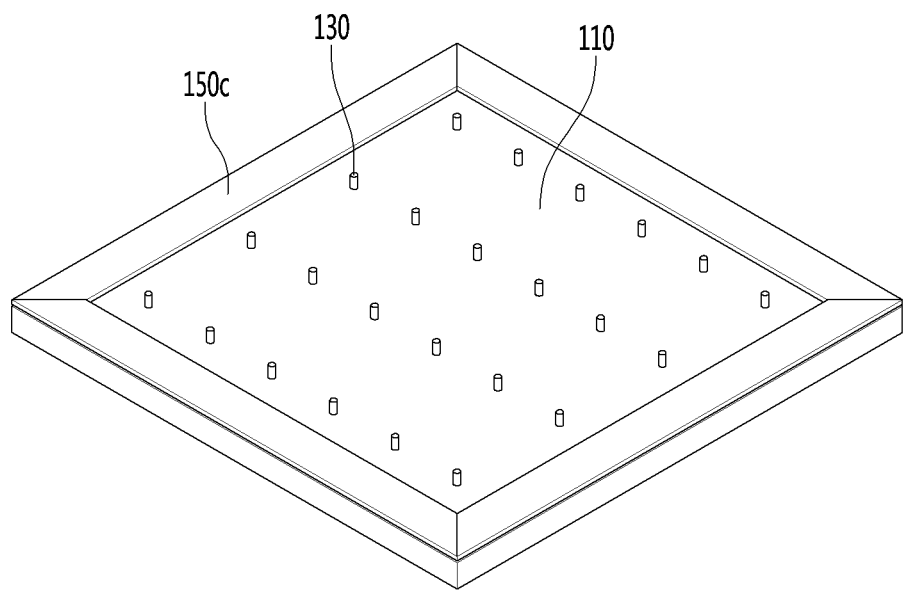
FIGS. 17A to 17D are views illustrating a method for manufacturing the vacuum glazing according to the third embodiment of the present disclosure.
Figure 17B:
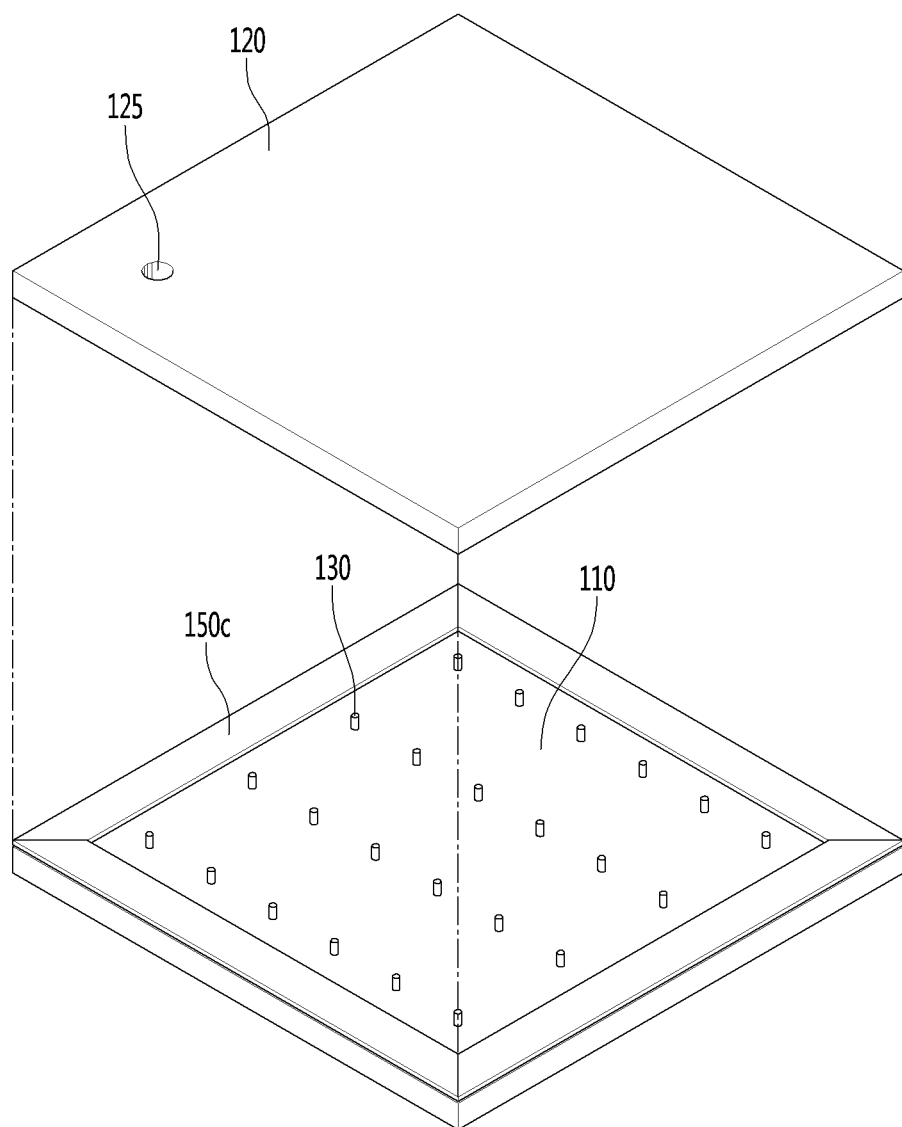
Figure 17C:
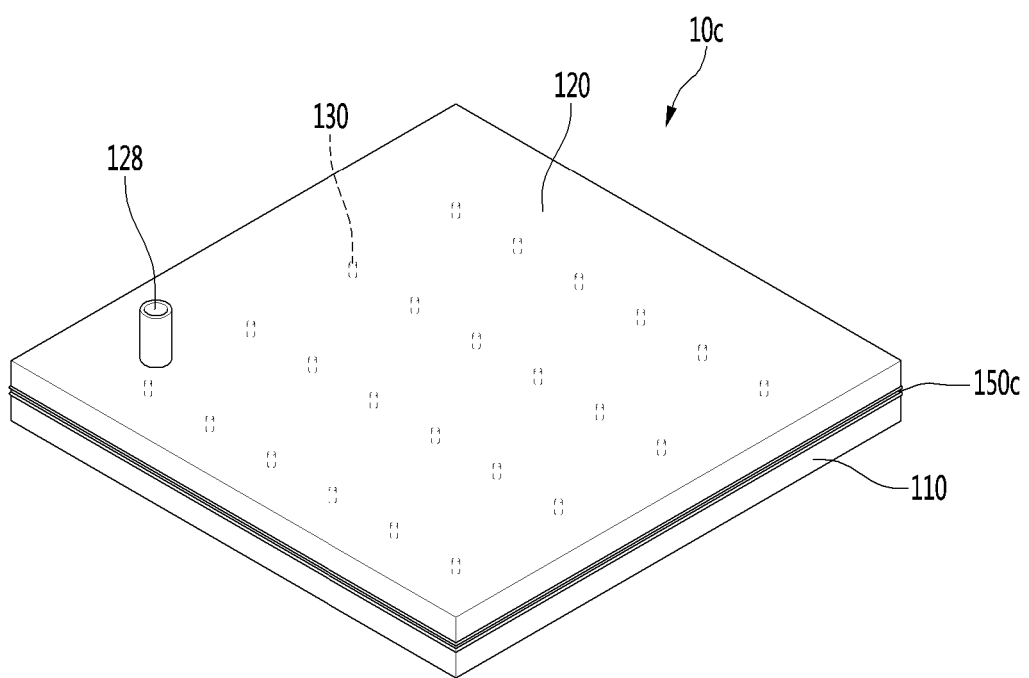

The second glazing 120 may be covered on the frame 150c (see FIG. 17B). After the frame 150c is interposed between the first and second glazings 110 and 120, the assembly between the first and second glazings 110 and 120 and the frame 150c is heated. In this heating procedure, the sealant 170c is melted and compressed to seal the space between the first and second glazings 110 and 120 and the frame 150c (see FIG. 13A).

Thereafter, the exhaust tube 128 is coupled to the exhaust hole 125 formed in the second glazing 120, and vacuum-pumping is performed through the exhaust tube 128. Accordingly, the vacuum layer 180c may be formed (see FIG. 17C).

Figure 17D:
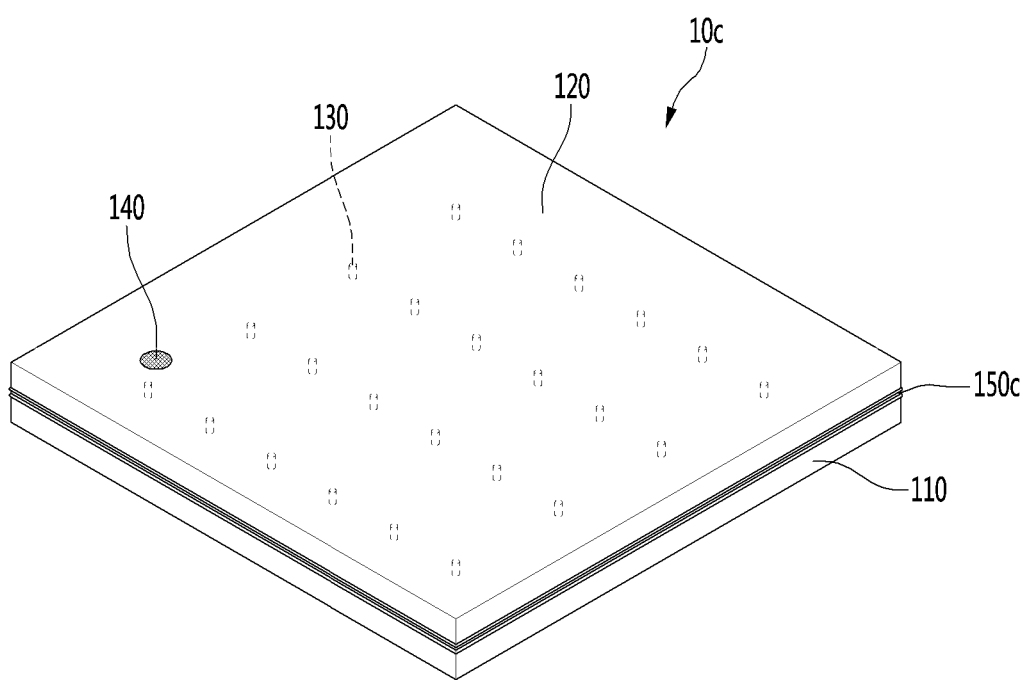

After the vacuum layer 180c is formed, the exhaust hole 125 is clogged by the exhaust finishing member 140, an exhaust cap 145 may be coupled to an outer portion of the exhaust finishing member 140 (see FIG. 17D). Through the manufacturing method, the vacuum glazing 10c may be easily manufactured.

Figure 18:
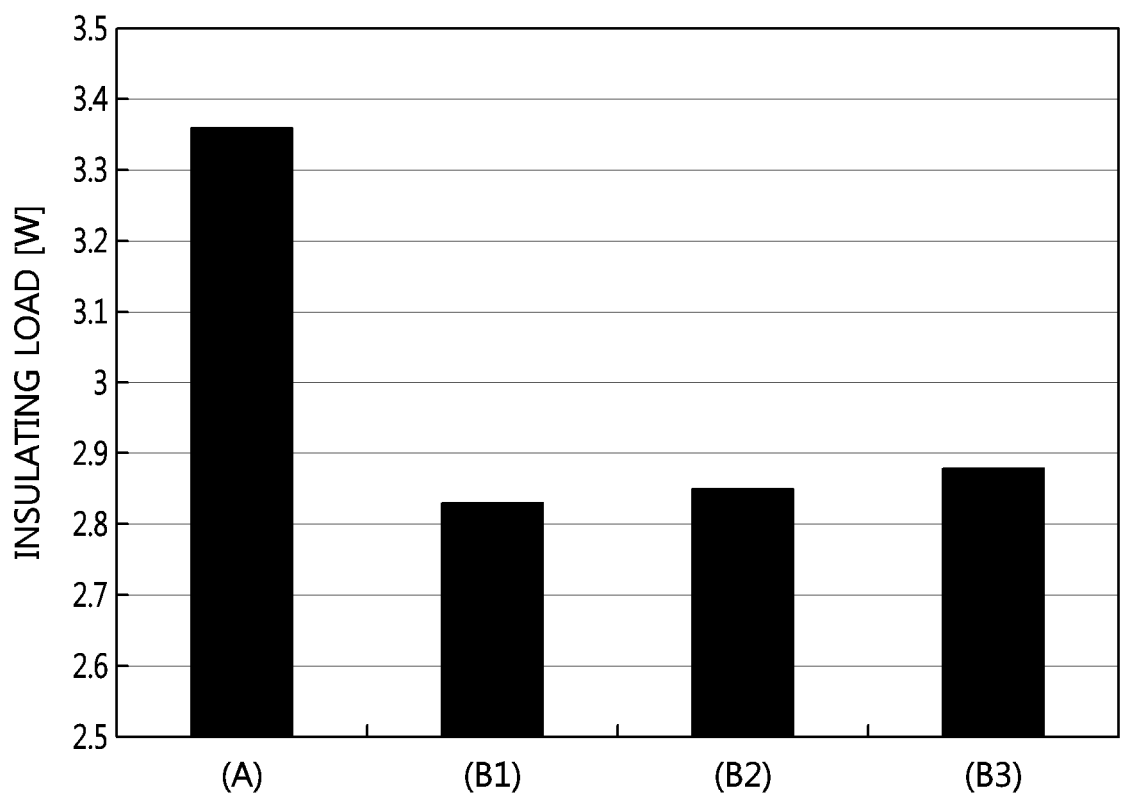
FIG. 18 is an experimental graph illustrating the comparison between insulating loads measured depending on the thickness of the frame according to the present disclosure.

FIG. 18 is an experimental graph illustrating the comparison between insulating loads measured depending on the thickness of the frame according to the present disclosure.

The insulating performance may be varied depending on the thickness of the frame according to the embodiment of the present disclosure. In the above description, it is suggested that the thicknesses of the frames 150, 150a, and 150b described in the first to third embodiments are in the range of 0.2-1.0 mm.

For example, FIG. 18 is a graph showing the comparison between the related art and the second embodiment of the present disclosure.

Referring to FIG. 18, reference sign A on a horizontal axis represents that only the sealant is provided instead of the frame between the first and second glazings. A vertical axis represents an insulating load, that is, a heat transfer load value. Those skilled in the art may understand that an amount of transferred heat is increased if the insulating load is increased.

Reference signs B1 and B3 represent the thickness of the frame 150a according to the second embodiment. In detail, reference sign B1 represents that the thickness t1 of the frame 150a is 0.2 mm, reference signal B2 represents that the thickness t1 of the frame 150a is 0.5 mm, and reference sign B3 represents that the thickness t1 of the frame 150a is 1.0 mm.

As known in graph, both reference signs B1 and B3 may represent a less insulating load as compared with reference sign. In summary, according to the embodiment of the present disclosure, as compared to the related art, the insulting performance of the vacuum glazing may be improved.

What is claimed is:

1. A vacuum glazing comprising:
a first glazing that defines a first surface;
a second glazing located at a side of the first glazing and spaced apart from the first glazing, the second glazing defining a second surface that faces the first surface;
a vacuum layer defined between the first surface of the first glazing and the second surface of the second glazing;
a spacer located in the vacuum layer and configured to support the first glazing and the second glazing;
a frame that is located at edge portions of the first glazing and the second glazing, that faces each of the first glazing and the second glazing, and that is located between the first surface of the first glazing and the second surface of the second glazing, wherein the frame defines the vacuum layer with the first surface of the first glazing and the second surface of the second glazing; and
a sealant that is provided between the frame and at least one surface of the first glazing and between the frame and at least one surface of the second glazing, the sealant being configured to provide a sealing to the vacuum layer,
wherein the sealant comprises:
a first sealant part located between the frame and the first surface of the first glazing, and
a second sealant part located between the frame and the second surface of the second glazing.

2. The vacuum glazing of claim 1, wherein the frame comprises a metallic material.

3. The vacuum glazing of claim 2, wherein the metallic material comprises a stainless material.

4. The vacuum glazing of claim 1, wherein the frame comprises a plurality of frame parts configured to couple to corner portions of each of the first glazing and the second glazing.

5. The vacuum glazing of claim 4, wherein each of the first glazing and the second glazing has a rectangular shape, and
wherein the plurality of frame parts comprises:
a first frame part configured to couple to a first corner portion of each of the first glazing and the second glazing;
a second frame part configured to couple to a second corner portion of each of the first glazing and the second glazing;
a third frame part configured to couple to a third corner portion of each of the first glazing and the second glazing; and
a fourth frame part configured to couple to a fourth corner portion of each of the first glazing and the second glazing.

6. The vacuum glazing of claim 5, wherein the frame has a hollow rectangular shape.

7. The vacuum glazing of claim 1, wherein a width of the vacuum layer is in a range of 0.18-0.22 mm in a vertical direction in which the second glazing is located vertically above the first glazing, and
wherein a thickness of the frame is in a range of 0.2-1.0 mm.

8. The vacuum glazing of claim 7, wherein each of the first surface of the first glazing and the second surface of the second glazing comprises a portion that is coupled to the frame and that extends by a lateral width in a range of 3-10 mm.

9. The vacuum glazing of claim 1, wherein the second glazing is spaced apart from the first glazing in a vertical direction, and the frame is located between the first glazing and the second glazing,
  wherein a vertical thickness of the frame is in a range of 0.1-1.0 mm in the vertical direction, and
  wherein a vertical thickness of the vacuum layer is in a range of 0.18-0.22 mm in the vertical direction, the vertical thickness of the vacuum layer corresponding to a distance between the first surface of the first glazing and the second surface of the second glazing.

10. The vacuum glazing of claim 1, wherein the first glazing includes a bottom surface that is opposite to the first surface and that is exposed to an outside of the vacuum glazing,
  wherein the second glazing includes a top surface that is opposite to the second surface and that is exposed to the outside, and
  wherein the sealant is absent from each of the bottom surface of the first glazing and the top surface of the second glazing.

11. The vacuum glazing of claim 10, wherein the first glazing further includes a first lateral side surface that connects the first surface and the bottom surface of the first glazing,
  wherein the second glazing further includes a second lateral side surface that connects the second surface and the top surface of the second glazing, and
  wherein the first and second lateral side surfaces are exposed to the outside.

12. The vacuum glazing of claim 1, wherein the first sealant part contacts each of the frame and the first surface of the first glazing, and
  wherein the second sealant part contacts each of the frame and the second surface of the second glazing.

* * * * *